(12) United States Patent
Okuno

(10) Patent No.: US 7,539,417 B2
(45) Date of Patent: May 26, 2009

(54) OPTICAL TRANSMISSION SYSTEM

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 486 days.

(21) Appl. No.: 10/639,587

(22) Filed: Aug. 13, 2003

(65) Prior Publication Data
US 2004/0037499 A1 Feb. 26, 2004

(30) Foreign Application Priority Data
Aug. 21, 2002 (JP) .............. P2002-240929
Jun. 3, 2003 (JP) .............. P2003-158179

(51) Int. Cl.
*H04J 14/02* (2006.01)
*H04B 10/12* (2006.01)

(52) U.S. Cl. .......... 398/81; 398/147; 398/159

(58) Field of Classification Search .......... 398/81, 398/147–150, 159
See application file for complete search history.

(56) References Cited

U.S. PATENT DOCUMENTS

| | | | |
|---|---|---|---|
| 6,044,189 A * | 3/2000 | Miller | 385/37 |
| 6,311,002 B1 | 10/2001 | Evangelides et al. | |
| 6,324,317 B1 | 11/2001 | Tanaka et al. | |
| 6,430,347 B1 | 8/2002 | Cain et al. | |
| 2002/0021862 A1 * | 2/2002 | Zhou et al. | 385/24 |
| 2002/0048070 A1 * | 4/2002 | Gabitov | 359/173 |
| 2002/0196491 A1 * | 12/2002 | Deng et al. | 359/124 |
| 2004/0208617 A1 * | 10/2004 | Essiambre et al. | 398/158 |

FOREIGN PATENT DOCUMENTS

| | | |
|---|---|---|
| EP | 1 073 221 A1 | 1/2001 |
| JP | 09-105833 | 4/1997 |
| JP | 9-116493 | 5/1997 |
| JP | 11-204866 | 7/1999 |
| JP | P2000-156702 A | 6/2000 |
| JP | 2001-036468 | 2/2001 |
| JP | 2002-057622 | 2/2002 |

(Continued)

OTHER PUBLICATIONS

Kartalopoulos, "Introduction to DWDM Technology"; IEEE Press; 2000; pp. 50, 51 and 55.*

(Continued)

*Primary Examiner*—Nathan M Curs
(74) *Attorney, Agent, or Firm*—McDermott Will & Emery LLP

(57) ABSTRACT

The invention relates to an optical transmission system which allows high quality transmission of signal light, and has a configuration that is suitable particularly for CWDM optical transmission. In the optical transmission system, signal channels outputted from non-temperature controlled direct modulation light sources are multiplexed by a multiplexer, transmitted through an optical fiber transmission line, and demultiplexed into a first wavelength band $\Lambda_1$ and second wavelength band $\Lambda_2$ by a demultiplexer. The signal channel group in the second wavelength band $\Lambda_2$ of which the absolute value of chromatic dispersion is large is dispersion-compensated for by a non-temperature controlled dispersion compensator. The chromatic dispersion of the signal channels in the second wavelength band $\Lambda_2$ after passing through the dispersion compensator is set to be negative over a temperature range of 0° C. to 60° C.

42 Claims, 11 Drawing Sheets

FOREIGN PATENT DOCUMENTS

JP        2002-232355 A    8/2002
WO      WO 01/93466 A3   12/2001

OTHER PUBLICATIONS

English Translation of Japanese Office Action issued in Japanese Application No. JP 2003-158179 dated on Mar. 11, 2008.

D.A. Atlas, "Chromatic Dispersion Limitations Due to Semiconductor Laser Chirping in Conventional and Disperion-Shifted Single-Mode Fiber Systems", Optics Letters, vol. 13, No. 11, pp. 1035-1037 (1988).

M. Kakui, et al. '2.4 Gbit/s Repeaterless Transmission Over 306 km Non-Dispersion-Shifted Fibre Using Directly Modulated DFB-LD and Dispersion-Compensating Fibre, Electronics Letters, vol. 31, No. 1, pp. 51-52, (1995).

M. Tanaka, et al. "Water-Peak-Suppressed Non-Zero-Dispersion Shifted Fiber for Full Spectrum Coarse WDM Transmission in Metro Networks", OFC 2002 WA 2.

Japanese Notice of Allowance issued in Patent Application No. P2003-158179 dated on Jul. 1, 2008.

\* cited by examiner

| FIBER LENGTH | MAXIMUM ACCUMULATED CHROMATIC DISPERSION | MAXIMUM TRANSMISSION PENALTY |
|---|---|---|
| 7 | 1000 | 1.0 |
| 14 | 20 | 0.1 |
| 14.3 | -20 | -0.1 |
| 15 | -100 | -0.2 |

Fig.11

| FIBER LENGTH | 1530 nm | | 1550 nm | | 1570 nm | | 1590 nm | |
|---|---|---|---|---|---|---|---|---|
| | ACCUMULATED CHROMATIC DISPERSION | TRANSMISSION PENALTY | ACCUMULATED CHROMATIC DISPERSION | TRANSMISSION PENALTY | ACCUMULATED CHROMATIC DISPERSION | TRANSMISSION PENALTY | ACCUMULATED CHROMATIC DISPERSION | TRANSMISSION PENALTY |
| 5 | 410 | 0.5 | 501 | 0.5 | 585 | 0.6 | 671 | 0.7 |
| 9 | 58 | 0.1 | 99 | 0.2 | 134 | 0.3 | 177 | 0.3 |
| 10 | -30 | -0.1 | 1 | 0.1 | 25 | 0.1 | 54 | 0.1 |
| 10.5 | -70 | -0.2 | -47 | -0.1 | -31 | -0.1 | -4 | 0 |
| 11 | -119 | -0.2 | -102 | -0.2 | -94 | -0.2 | -71 | -0.2 |
| 15 | -462 | -0.2 | -493 | -0.3 | -541 | -0.3 | -572 | -0.3 |

Fig.12

| FIBER LENGTH | 1530nm | 1550nm | 1570nm | 1590nm |
|---|---|---|---|---|
| 9 | 0.8 | 1.1 | 1.7 | 3.1 |
| 10 | -0.1 | 0.1 | 0.3 | 0.6 |
| 10.5 | -0.2 | -0.1 | -0.1 | 0 |
| 11 | -0.3 | -0.3 | -0.3 | -0.2 |

OPTICAL TRANSMISSION SYSTEM

BACKGROUND OF THE INVENTION

1. Field of the Invention

The present invention relates to an optical transmission system for transmitting signal light, where a plurality of signal channels included in a signal wavelength band are multiplexed, through an optical fiber transmission line.

2. Related Background Art

A Wavelength Division Multiplexing (WDM) optical transmission system transmits signal light, where a plurality of signal channels with mutually different wavelengths are multiplexed, through an optical fiber transmission line, so as to enable the high-speed transmission/reception of large capacity information. The optical transmission system can suppress waveform deterioration of signal light by decreasing the absolute value of the accumulated chromatic dispersion of an entire signal propagation path. By this, the optical transmission system can increase the bit rate and allow larger capacity.

For example, the optical transmission system disclosed in Japanese Patent Laid-Open No. H11-204866 has a configuration for demultiplexing the signal channels included in the multiplexed signal light into a plurality of wavelength bands, and performing dispersion compensation for each band. By this, the absolute value of the accumulated chromatic dispersion is decreased for each band.

In Document 1, "D. A. Atlas, 'Chromatic dispersion limitations due to semiconductor laser chirping in conventional and dispersion-shifted single-mode fiber systems', Optics Letters, Vol. 13, No. 11, pp. 1035-1037 (1988)", the relationship between the accumulated chromatic dispersion and the transmission characteristics is shown concerning the configuration using a direct modulation semiconductor laser light source for the signal light source. In Document 1, the values of dispersion resistance, to acquire good signal transmission quality, are stated, where the dispersion resistance is 1200 ps/nm when the bit rate is 2.5 Gb/s, and the dispersion resistance is 80 ps/nm when the bit rate is 10 Gb/s.

The optical transmission system stated in Document 2, "M. Kakui, et al, '2.4 Gbit/s repeaterless transmission over 306 km non-dispersion-shifted fiber using directly modulated DFB-LD and dispersion-compensating fiber', Electronics Letters, Vol. 31, No. 1, pp. 51-52, (1995)" intends to make the absolute value of accumulated chromatic dispersion to roughly zero, where the direct modulation semiconductor laser light source is used as the signal light source and dispersion-compensating optical fiber is used as the dispersion compensator.

Also in the optical transmission system stated in Document 3, "M. Tanaka, et al, 'Water-peak-suppressed non-zero-dispersion shifted fiber for full spectrum coarse WDM transmission in metro networks', OFC 2002, WA2", an optical fiber, where the loss peak due to an OH-radical near wavelength 1.38 μm is decreased, is applied. Document 3 shows the configuration where a direct modulation semiconductor laser light source is used for the signal light source, where the accumulated chromatic dispersion is about 1000 ps/nm and the transmission penalty is 1 dB when the bit rate is 2.5 Gb/s.

SUMMARY OF THE INVENTION

After studying conventional optical transmission systems, the present inventor discovered the following problem. An optical transmission system which performs CWDM (Coarse WDM) optical transmission in which the signal channel spacing (signal wavelength spacing) in a multiplexed signal light is relatively wide (see Japanese Patent Laid-Open No. 2000-156702, for example) is generally applied to a route where communication demand is relatively small. Therefore the semiconductor laser light source which is used as the signal light source is directly modulated, and dispersion compensation is not normally performed because of the demand to decrease system cost.

With the foregoing in view, it is an object of the present invention to provide an optical transmission system which allows high quality transmission of signal light, and is particularly appropriate for CWDM optical transmission.

The optical transmission system according to the present invention comprises, an optical transmitter including a non-temperature controlled direct modulation light source, an optical receiver, an optical fiber transmission line which is disposed between the optical transmitter and the optical receiver, and at least one non-temperature controlled dispersion compensator. The optical transmitter outputs signal light in the signal wavelength band. The optical fiber transmission line is a transmission medium for transmitting the multiplexed signal light where a plurality of signal channels in the signal wavelength band are multiplexed, and has a positive chromatic dispersion in an operation wavelength of the direct modulation light source. The optical receiver receives the signal light having propagated through the optical fiber transmission line. The dispersion compensator is an optical component for compensating for the accumulated chromatic dispersion of the optical fiber transmission line, and is disposed either on an optical path between the signal transmitting end of the optical transmitter and the signal entering end of the optical fiber transmission line, or on an optical path between the signal receiving end of the optical receiver and the signal emitting end of the optical fiber transmission line. Of cause, the optical transmitter may output some signal channels in the signal wavelength band.

When the dispersion compensator is disposed on the optical path between the signal transmitting end of the optical transmitter and the signal entering end of the optical fiber transmission line, at the signal emitting end of the optical fiber transmission line, the accumulated chromatic dispersion of the optical fiber transmission line at the operation wavelength of the direct modulation light source is set to negative in a temperature range of 0° C. to 60° C. On the other hand, when the dispersion compensator is disposed on the optical path between the signal receiving end of the optical receiver and the signal emitting end of the optical fiber transmission line, at the signal receiving end of the optical receiver, the chromatic dispersion of the signal light at the operation wavelength of the direct modulation light source is set to negative in a temperature range of 0° C. to 60° C.

In accordance with the optical transmission system having the abovementioned structure, the signal light can be transmitted at high quality. Since the direct modulation light source and the dispersion compensator are non-temperature controlled devices respectively, system cost decreases.

The optical transmission system according to the present invention may further comprise a demultiplexer. In this case, the demultiplexer demultiplexes a plurality of signal channels propagating through the optical fiber transmission line into one signal channel group in a first wavelength band including the zero-dispersion wavelength of the optical fiber transmission line and the other signal channel group in a second wavelength band. The dispersion compensator compensates for the accumulated chromatic dispersion in signal channels of the second wavelength band. At the signal outputting end of the dispersion compensator, the accumulated chromatic dispersion in one of the signal channels of the second wavelength band, which passed through the dispersion compensator, is preferably negative in a temperature range of 0° C. to 60° C.

The first wavelength band is a wavelength band which includes a zero-dispersion wavelength of the optical fiber transmission line, and in the second wavelength band, the absolute value of the accumulated chromatic dispersion is larger as compared with the first wavelength band. Therefore, the signal light of the second wavelength band, where the absolute value of the accumulated chromatic dispersion is large, is dispersion-compensated by the non-temperature controlled dispersion compensator. After passing through the dispersion compensator, the accumulated chromatic dispersion at the signal outputting end of the dispersion compensator is set so as to be negative at the above mentioned operation wavelength in the temperature range of 0° C. to 60° C. Because of the above configuration, the optical transmission system according to the present invention can transmit multiplexed signal light in the signal wavelength band at high quality, and becomes a system particularly suitable for CWDM optical transmission. The dispersion compensator can be disposed only for the signal channels in the second wavelength band, and the direct modulation light source and the dispersion compensator are non-temperature control devices respectively, so system cost can be decreased. Also in CWDM optical transmission, the signal channel spacing (signal wavelength spacing) included in the signal light is wide, so an inexpensive optical fiber can be used for the demultiplexer.

In the optical transmission system according to the present invention, it is preferable that the accumulated chromatic dispersion in all the signal channels of the second wavelength band which passed through the dispersion compensator is negative in the temperature range 0° C. to 60° C. In this case, a higher quality signal light transmission is possible.

Also, in the optical transmission system according to the present invention, it is preferable that a bit rate of at least one signal channel among the signal channels included in the second wavelength band is higher than any bit rate of all the signal channels in the first wavelength band. In this case, the transmission speed can be upgraded intentionally from the dispersion-compensated side, therefore system improvement with a simple configuration at lost cost can be expected.

In the optical transmission system according to the present invention, it is preferable that the optical fiber transmission line includes a single-mode optical fiber having a zero-dispersion wavelength of near 1.3 μm. In this case, the single-mode optical fiber which has already been laid can be used as an optical fiber transmission line, so an increase in system cost can be suppressed.

It is preferable that the optical fiber transmission line, at a wavelength 1.38 μm, has a transmission loss smaller than a transmission loss at a wavelength of 1.31 μm. This is because signal channels of a wavelength of near 1.38 μm can be used, which allows a further increase in capacity. It is also preferable that the optical fiber transmission line has a zero-dispersion wavelength which exists in a wavelength range of 1.35 μm to 1.5 μm. This is because the chromatic dispersion of the optical fiber transmission line at the shorter wavelength side of the signal wavelength band is a negative value (or a small positive value), so the transmission characteristics of all the signal channels in the signal wavelength band are improved.

It is also preferable that, at the signal receiving end of the receiver, the optical power of one of the signal channels in the second wavelength band is higher than the lowest optical power among the optical power of the signal channels in the first wavelength band. In this case, the loss increase, due to the insertion of the dispersion compensator, is suppressed, and the transmission distance can be increased, and also deterioration of the loss budget of the system can be avoided.

Also, it is preferable that at the signal receiving end of the receiver, the optical power of all the signal channels in the second wavelength band is higher than the lowest optical power among the optical power of the signal channels in the first wavelength band. In this case, the loss budget of the entire system can be defined by a value in the first wavelength band, which makes system design easy. Also, a loss budget can be sufficiently secured, so the reliability of the entire system improves.

It is preferable that the optical transmission system according to the present invention further comprises pumping light supply means for supplying Raman-amplification pumping light into the optical fiber transmission line, so as to Raman-amplify the signal light. In this case, the signal light is Raman-amplified in the optical fiber transmission line to which the Raman-amplification pumping light is supplied, so an effective transmission loss can be decreased, and a loss increase due to the insertion of the dispersion compensator can be compensated. It is preferable that the pumping light supply means supplies the Raman-amplification pumping light with a plurality of pumping channels included in a wavelength range of 1.2 μm to 1.3 μm are multiplexed to the optical fiber transmission line. In this case, the signal light near wavelength 1.31 μm, where transmission loss is particularly high, is Raman-amplified, and an effective transmission loss near this wavelength can be decreased.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 11 is a table showing the chromatic dispersion characteristics of Example 2 of the optical transmission system according to the present invention;

FIG. 12 is a table showing the transmission penalty characteristics of Example 3 of the optical transmission system according to the present invention.

DESCRIPTION OF THE PREFERRED EMBODIMENTS

Figure 1:
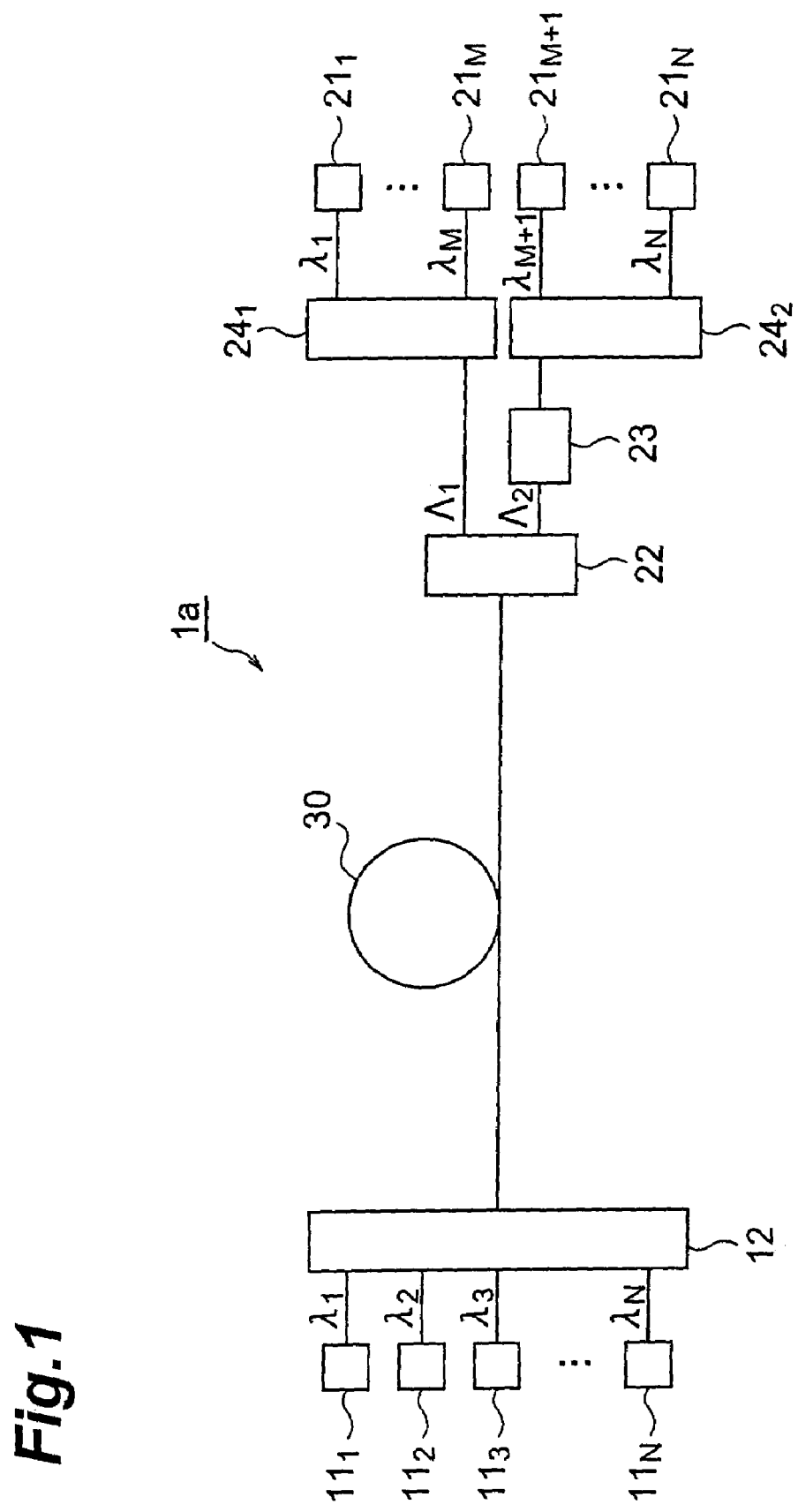
FIG. 1 is a diagram depicting the configuration of the first embodiment of the optical transmission system according to the present invention.

Embodiments of the optical transmission system according to the present invention will now be described in detail with reference to FIGS. 1 to 12 and 13A to 13C. In the description of the drawings, identical composing elements are denoted with identical reference numerals, for which redundant descriptions are omitted.

First Embodiment

At first, the first embodiment of the optical transmission system according to the present invention will be described. FIG. 1 is a diagram depicting the configuration of the optical transmission system $1a$ according to the first embodiment. The optical transmission system $1a$ shown in FIG. 1 comprises N number of (N is an integer 2 or higher) direct modulation light sources $11_1$ to $11_N$ (included in the optical transmitter), multiplexer 12, N number of receivers $21_1$ to $21_N$ (included in the optical receiver), demultiplexer 22, dispersion compensator 23, demultiplexer $24_1$, demultiplexer $24_2$, and optical fiber transmission line 30.

The direct modulation light source $11_n$ (n is an arbitrary integer 1 or more N or less) includes a non-temperature controlled semiconductor laser light source which outputs directly modulated light with wavelength $\lambda_n$ as a signal channel. The multiplexer 12 multiplexes light with wavelength $\lambda_n$ which are outputted from the direct modulation light source $11_n$, and sends the multiplexed signal light with signal channel wavelengths $\lambda_1$ to $\lambda_N$ to the optical fiber transmission line 30. The wavelengths $\lambda_1$ to $\lambda_N$ of these signal channels are included in the signal wavelength band from a wavelength of about 1.3 μm to a wavelength of about 1.61 μm, and the signal channel spacing (wavelength spacing) is relatively wide. In other words, this optical transmission system $1a$ is a system to implement CWDM optical transmission.

The optical fiber transmission line 30 transmits the multiplexed signal light with signal channel wavelengths $\lambda_1$ to $\lambda_N$, which were outputted from the multiplexer 12, into the demultiplexer 22. This optical fiber transmission line 30 is preferably a standard single-mode optical fiber having a zero-dispersion wavelength of near 1.3 μm, or a non-zero-dispersion shifted optical fiber (NZDSF) having a zero-dispersion wavelength in a wavelength range of 1.35 μm to 1.5 μm. It is preferable that the optical fiber transmission line 30, at a wavelength of 1.38 μm, has a transmission loss smaller than a transmission loss at a wavelength of 1.31 μm.

The demultiplexer 22 is installed at the signal emitting end side of the optical fiber transmission line 30, and demultiplexes the signal channels with wavelengths $\lambda_1$ to $\lambda_N$, which are included in the multiplexed signals propagating through the optical fiber transmission line 30, into the signal channel group in the first wavelength band $\Lambda_1$ and the signal channel group in the second wavelength band $\Lambda_2$. The first wavelength band $\Lambda_1$ is a wavelength band which includes the zero-dispersion wavelength of the optical fiber transmission line 30, and the second wavelength band $\Lambda_2$ is the other wavelength band. When the optical transmission line 30 includes a standard single-mode optical fiber, the second wavelength band $\Lambda_2$ locates at the longer wavelength side from the first wavelength band $\Lambda_1$.

The dispersion compensator 23 is a non-temperature controlled optical device, and compensates for the dispersion of the signal channel group with wavelengths $\lambda_{m+1}$ to $\lambda_N$ (M is an integer of 2 or more (N−1) or less) included in the second wavelength band $\Lambda_2$, which are outputted from the demultiplexer 22. The dispersion compensator 23 has a chromatic dispersion with the opposite sign from the chromatic dispersion of the optical fiber transmission line 30 in the second wavelength band $\Lambda_2$. For the dispersion compensator 23, a dispersion compensating optical fiber, for example, is suitable, and in this case, loss is small, connection with other optical fibers is easy, and use in a wide band is possible. The dispersion compensator 23 may be a bulk type device, and in this case, the dispersion compensator has periodicity, can be used in a wide band where the dispersion characteristic can be variable, and can be used even at high input power. And the dispersion compensator 23 may be a flat optical guide type device, and in this case downsizing is possible, the dispersion compensator 23 can be used in a wide band, and can be used at high input power.

The demultiplexer $24_1$ demultiplexes the signal light included in the first wavelength band $\Lambda_1$, which are outputted from the demultiplexer 22, into each signal channel with wavelengths $\lambda_1$ to $\lambda_M$. The demultiplexer $24_2$, on the other hand, demultiplexes the signal light included in the second wavelength band $\Lambda_2$, whose chromatic dispersion is compensated by the dispersion compensator 23, into each signal channel with wavelengths $\lambda_{M+1}$ to $\lambda_N$. Each receiver $21_n$ (n=1 to N) receives the light of each signal channel with wavelength $\lambda_n$, which is outputted from the demultiplexer $24_1$ or the demultiplexer $24_2$.

The optical transmission system $1a$ according to the first embodiment operates as follows. The signal channels with wavelength $\lambda_n$, which are outputted from each one of the non-temperature controlled direct modulation light sources $11_n$, are multiplexed by the multiplexer 12, and the multiplexed signal light, including the signal channels with wavelengths $\lambda_1$ to $\lambda_N$, are sent to the optical fiber transmission line 30. The signal channels of the multiplexed signal light, which propagated through the optical fiber transmission line 30 and reach the demultiplexer 22, are demultiplexed into the signal channel group in the first wavelength band $\Lambda_1$ and the signal channel group in the second wavelength band $\Lambda_2$ by the demultiplexer 22. The signal channel group (wavelengths $\lambda_1$ to $\lambda_M$) included in the first wavelength band $\Lambda_1$, where the absolute value of the chromatic dispersion is small, which are outputted from the demultiplexer 22, are demultiplexed into each signal channel by the demultiplexer $24_1$, and are received by the receivers $21_1$ to $21_M$ respectively. The signal channel group (wavelengths $\lambda_{M+1}$ to $\lambda_N$) included in the second wavelength band $\Lambda_2$, where the absolute value of the chromatic dispersion is large, which are outputted from the demultiplexer 22, are dispersion-compensated by the non-temperature controlled dispersion compensator 23, then demultiplexed into each signal channel by the demultiplexer $24_2$, and received by the receivers $21_{M+1}$ to $21_N$.

At this time, the chromatic dispersion of one of the signal channels in the second wavelength band $\Lambda_2$ after passing through the dispersion compensator 23 (chromatic dispersion at the signal receiving end of the receivers $21_{M+1}$ to $21_N$) is set to be negative in a temperature range of 0° C. to 60° C. Also the chromatic dispersion of all the signal channels in the second wavelength band $\Lambda_2$ after passing through the dispersion compensator 23 may be set to be negative in the temperature range of 0° C. to 60° C.

At the signal receiving ends of the receivers $21_1$ to $21_N$, it is preferable that the optical power of one of the signal channels in the second wavelength band $\Lambda_2$ is set to be higher than the lowest optical power among the optical powers of the signal channels in the first wavelength band $\Lambda_1$. Also at the signal receiving ends of the receivers $21_1$ to $21_N$, the optical power of all the signal channels in the second wavelength band $\Lambda_2$ may be set to be higher than the lowest optical power among the optical powers of the signal channels in the first wavelength band $\Lambda_1$.

By setting the chromatic dispersion characteristic and the loss characteristic as above, the optical transmission system 1a can transmit the multiplexed signal light, including a plurality of signal channels in the signal wavelength band at high quality, and becomes a system particularly suitable for CWDM optical transmission. In the optical transmission system 1a, the dispersion compensator 23 is disposed for only the signal channel group at one side of the second wavelength band $\Lambda_2$, and since each direct modulation light source $11_n$ and the dispersion compensator 23 are non-temperature controlled devices respectively, system cost decreases. Also the signal channel spacing is wide in CWDM optical transmission, so an inexpensive optical filter can be used for the demultiplexer 22.

Figure 2:
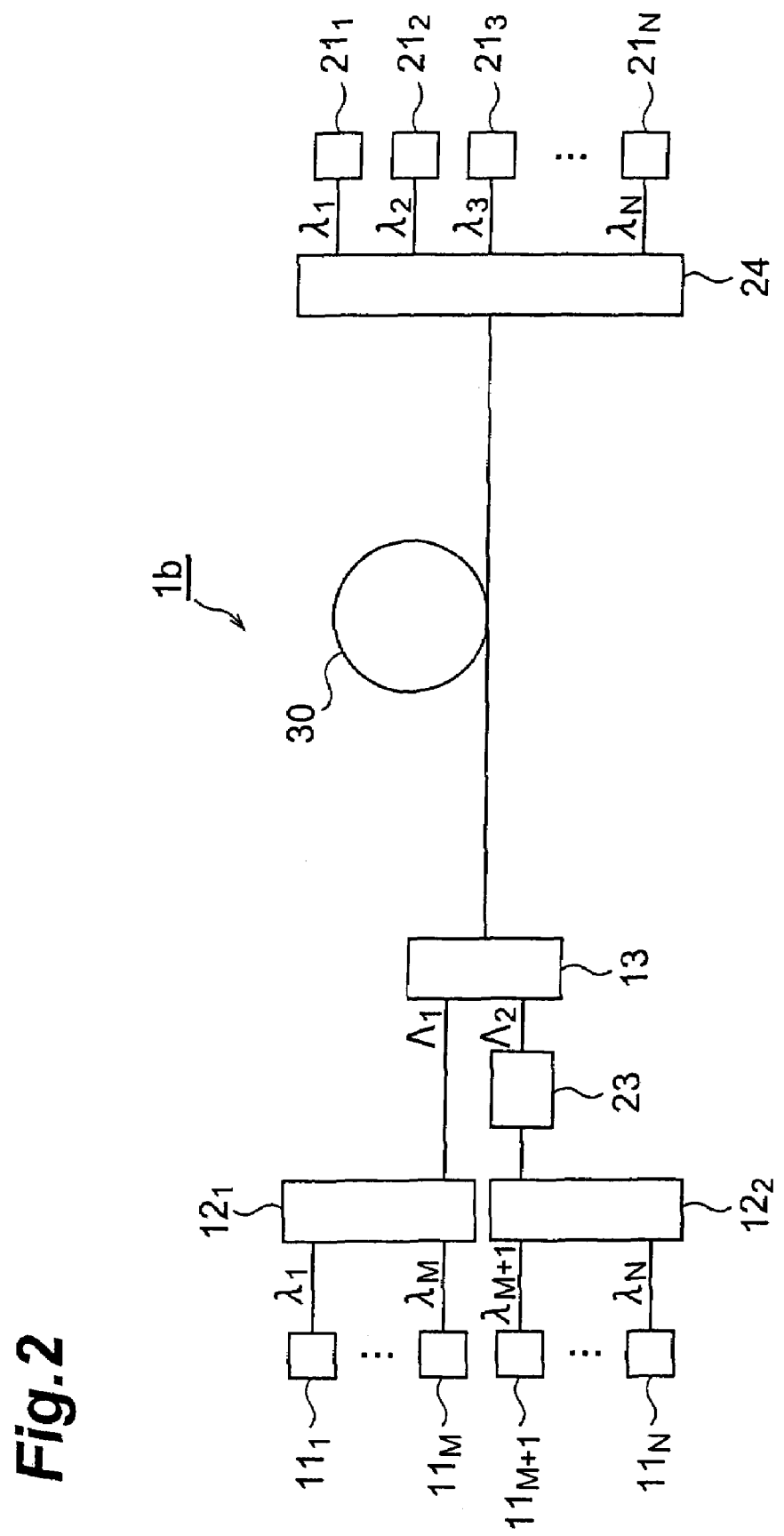
FIG. 2 is a diagram depicting the configuration of the first application example of the optical transmission system according to the first embodiment shown in FIG. 1.

In the above mentioned configuration, the dispersion compensator 23 is disposed at the signal emitting end side of the optical fiber transmission line 30, but the dispersion compensator 23 may be disposed at the signal entering end side of the optical fiber transmission line 30, as shown in FIG. 2. FIG. 2 is a diagram depicting the configuration of the first application example of the optical transmission system 1a according to the first embodiment shown in FIG. 1.

In the optical transmission system 1b according the first application example, the signal channels with wavelengths $\lambda_1$ to $\lambda_M$ included in the first wavelength band $\Lambda_1$, which are outputted from the non-temperature controlled direct modulation light sources $11_1$ to $11_M$, are multiplexed by the multiplexer $12_1$. The signal channels with wavelengths $\lambda_{M+1}$ to $\lambda_N$ included in the second wavelength band $\Lambda_2$, which are outputted from the non-temperature controlled direct modulation light source $11_{M+1}$ to $11_N$, are multiplexed by the multiplexer $12_2$.

The signal channel group included in the second wavelength band $\Lambda_2$ is dispersion-compensated by the dispersion compensator 23, then is multiplexed by the multiplexer 13 along with the signal channel group included in the first wavelength band $\Lambda_1$. The multiplexed signal light, including the signal channels with wavelengths $\lambda_1$ to $\lambda_N$, which are multiplexed by this multiplexer 13, propagates through the optical fiber transmission line 30, which is constituted by a single-mode optical fiber with a length of 100 km, for example, and reaches the demultiplexer 24.

The multiplexed signal light which reaches the demultiplexer 24 is demultiplexed into each signal channel by the demultiplexer 24, and each signal channel is received by the receivers $21_1$ to $21_N$ respectively, which are disposed corresponding to each signal channel.

Figure 3:
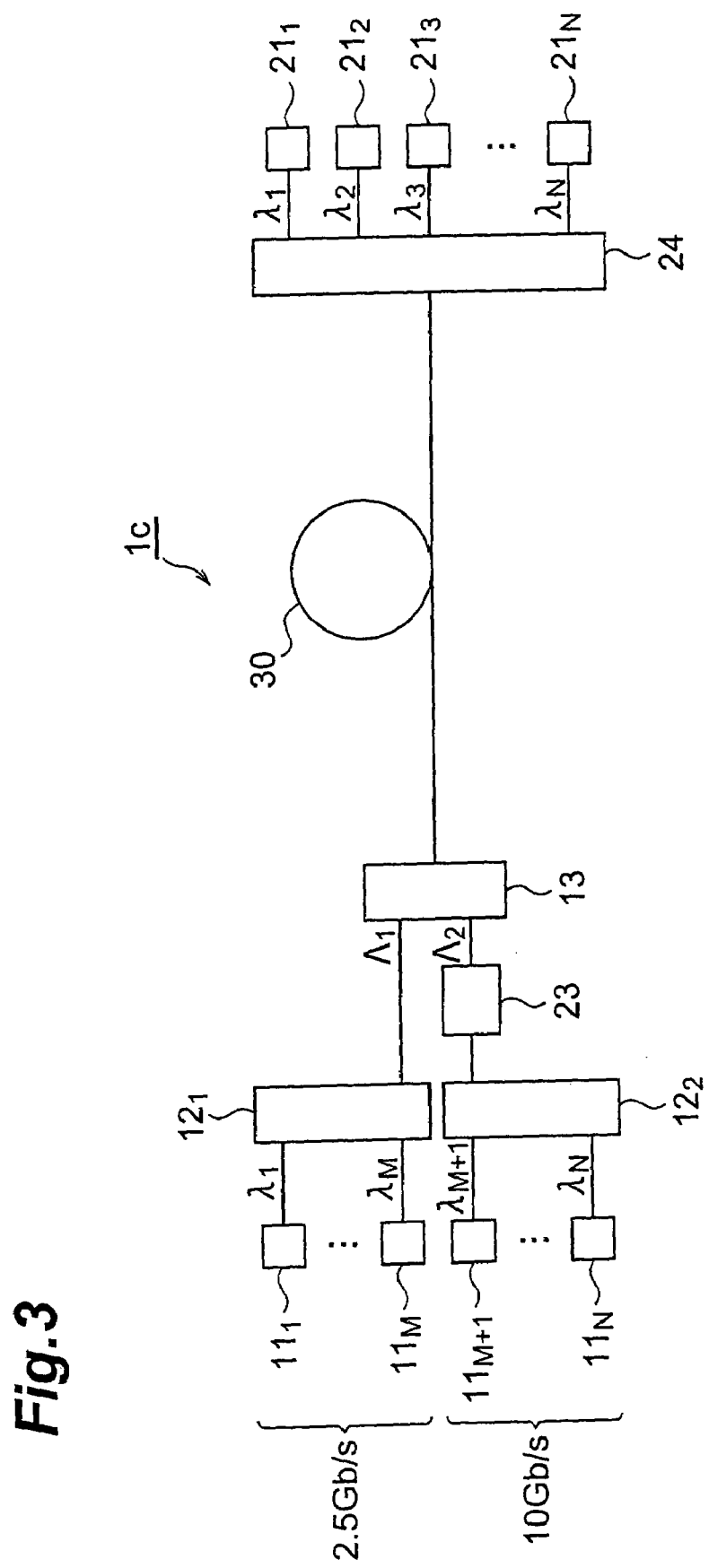
FIG. 3 is a diagram depicting the configuration of the second application example of the optical transmission system according to the first embodiment shown in FIG. 1.

The optical transmission system according to the first embodiment can also perform hybrid transmission for a plurality of signal channels with different transmission speeds. FIG. 3 is a diagram depicting the configuration of the second application example of the optical transmission system according to the first embodiment shown in FIG. 1, and has basically a configuration similar to the optical transmission system 1b according to the first application example shown in FIG. 2.

In the optical transmission system 1c according to the second application example, the transmission speed of the signal channels with wavelengths $\lambda_1$ to $\lambda_M$, which are outputted from the direct modulation light sources $11_1$ to $11_M$, is 2.5 Gb/s, while the transmission speed of the signal channels with wavelengths $\lambda_{M+1}$ to $\lambda_N$, which are outputted from the direct modulation light sources $11_{M+1}$ to $11_N$, is 10 Gb/s. In this optical transmission system 1c, the signal channel with a high bit rate (10 Gb/s) is dispersion-compensated by the dispersion compensator 23, which is a dispersion compensating optical fiber (DCF).

For example, in this optical transmission system 1c, signal channels with wavelengths of 1490 nm to 1550 nm from the direct modulation light sources $11_1$ to $11_M$ are multiplexed by the multiplexer $12_1$ as a signal channel group in the first wavelength band $\Lambda_1$, where the transmission speed is 2.5 Gb/s. As the signal channel group in the second wavelength band $\Lambda_2$, where the transmission speed is 10 Gb/s, on the other hand, the signal channels with wavelengths of 1570 nm and 1590 nm from the direct modulation light sources $11_{M+1}$ to $11_N$ are multiplexed by the multiplexer $12_2$. The signal channel group in the second wavelength band $\Lambda_2$ is further dispersion-compensated by the DCF 23, and the chromatic dispersion is decreased until residual dispersion becomes less than 10 ps/nm. Then the signal channel group in the second wavelength band $\Lambda_2$ is multiplexed by the multiplexer 13 along with the signal channel group in the first wavelength band $\Lambda_1$. The multiplexed signal light, including the signal channels with wavelengths of 1490 nm to 1590 nm, which are outputted from the multiplexer 13, propagates through the optical fiber transmission line 30 (e.g. a single-mode optical fiber with a length of 50 km), and reaches the demultiplexer 24. In this demultiplexer 24, the multiplexed signal light is demultiplexed into signal channels, which are received by the receivers $21_1$ to $21_N$ corresponding to these signals respectively.

If upgradeable signal channels are determined in advance and dispersion compensation, is performed for the signal channels by the dispersion compensator, such as DCF, as shown in the optical transmission system 1c, then transmission speed can be easily upgraded from 2.5 Gb/s to 10 Gb/s merely by switching the optical transmitter and the optical receiver.

Figure 4:
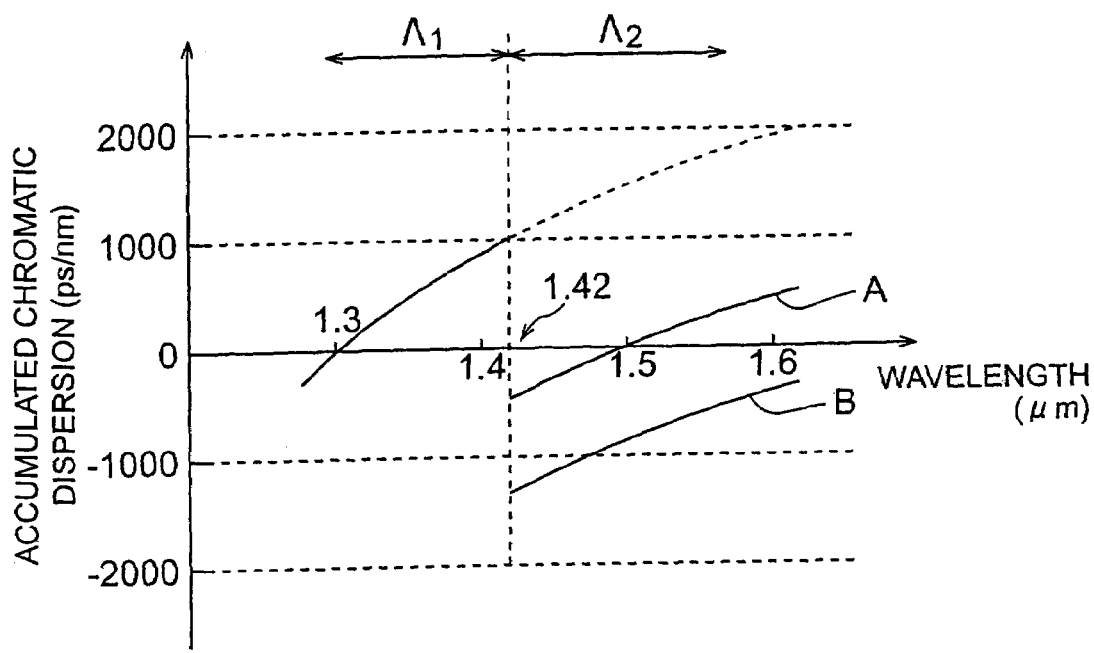
FIG. 4 is a graph depicting the chromatic dispersion characteristics of the optical transmission system according to the first embodiment shown in FIG. 1 (No. 1)

FIG. 4 is a graph depicting the chromatic dispersion characteristics of the optical transmission system 1a according to the first embodiment. In this optical transmission system 1a, the optical fiber transmission line 30 is a standard single-mode optical fiber with a length of 100 km. The dispersion compensator 23 is a dispersion compensating optical fiber having a chromatic dispersion of −100 ps/nm/km, a dispersion slope of 0 ps/nm²/km, and a transmission loss of 0.5 dB/km, as characteristics at a wavelength of 1.55 μm. The insertion loss of the multiplexer 12, demultiplexer $24_1$ and demultiplexer $24_2$ are 3 dB respectively. The insertion loss of the multiplexer 22 is 1 dB. The optical transmission system 1a is assumed to be a system with a dispersion resistance of 1000 ps/nm, which transmits 16-channel signal light (channel spacing of 20 nm) in a wavelength range of 1.31 µm to 1.61 µm at a bit rate of 2.5 Gb/s.

When the dispersion compensator 23 is not disposed, the accumulated chromatic dispersion exceeds the dispersion resistance depending on the wavelength (broken line in FIG. 4). However in the optical transmission system 1a according to the first embodiment, each signal channel included in the second wavelength band $\Lambda_2$ (wavelengths of 1.42 µm to 1.61 µm), where the absolute value of chromatic dispersion in the optical fiber transmission line 30 is large, is dispersion-compensated by the dispersion compensator 23, so the accumulated chromatic dispersion of the entire system is less than the dispersion resistance (solid line A or B in FIG. 4). The solid line A in FIG. 4 is the case when the chromatic dispersion is compensated so that the average chromatic dispersion becomes roughly zero in the second wavelength band $\Lambda_2$. The solid line B in FIG. 4 shows the case when the chromatic dispersion is compensated so that the average chromatic dispersion becomes negative in the second wavelength band $\Lambda_2$. Since the light source $11_n$ is a direct modulation light source respectively, it is preferable that the average chromatic dispersion in the second wavelength band $\Lambda_2$ becomes negative, as the solid line B shows.

Figure 5:
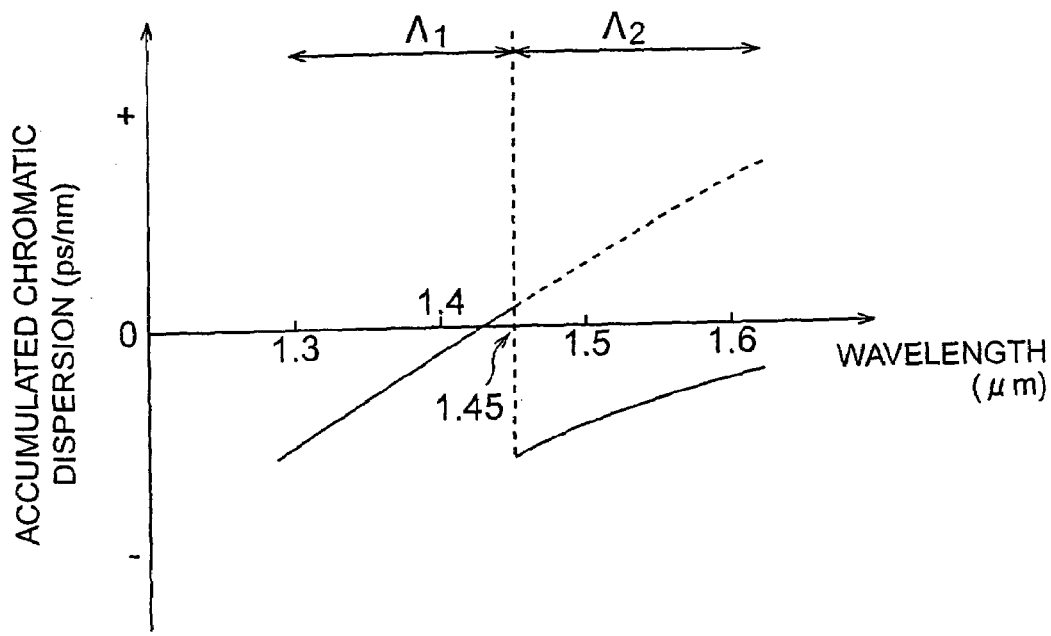
FIG. 5 is a graph depicting the chromatic dispersion characteristics of the optical transmission system according to the first embodiment shown in FIG. 1 (No. 2)

FIG. 5 is a graph depicting other chromatic dispersion characteristics of the optical transmission system 1a according to the first embodiment. In this optical transmission system 1a, the optical fiber transmission line 30 is a non-zero-dispersion shifted optical fiber (NZDSF) with a length of 50 km. This non-zero-dispersion-shifted optical fiber has a zero-dispersion wavelength of 1.43 µm and a transmission loss of 0.2 dB/km, at a wavelength of 1.55 µm. The dispersion compensator 23 is a dispersion compensating optical fiber having a chromatic dispersion of −80 ps/nm/km, a dispersion slope of −0.1 ps/nm²/km, and a transmission loss of 0.5 dB/km, as characteristics at a wavelength of 1.55 µm. The insertion loss of the multiplexer 12, demultiplexer 24, and demultiplexer $24_2$ is 3 dB respectively. The insertion loss of the demultiplexer 22 is 1 dB. This optical transmission system 1a is assumed to be a system with a dispersion resistance of 75 ps/nm, which transmits 16-channel signal light (channel spacing of 20 nm) in a wavelength range of 1.31 µm to 1.61 µm at a bit rate of 10 Gb/s.

In this case as well, the accumulated chromatic dispersion exceeds dispersion resistance depending on the wavelength if the dispersion compensator 23 is not disposed. However, in the optical transmission system 1a according to the first embodiment, each signal channel included in the second wavelength band $\Lambda_2$ (wavelengths of 1.45 µm to 1.61 µm), where the absolute value of chromatic dispersion in the optical fiber transmission line 30 is large, is dispersion-compensated by the dispersion compensator 23 so the accumulated chromatic dispersion in the entire system becomes negative. The transmission penalty is 1 dB or less in all the signal channels.

Second Embodiment

Figure 6:
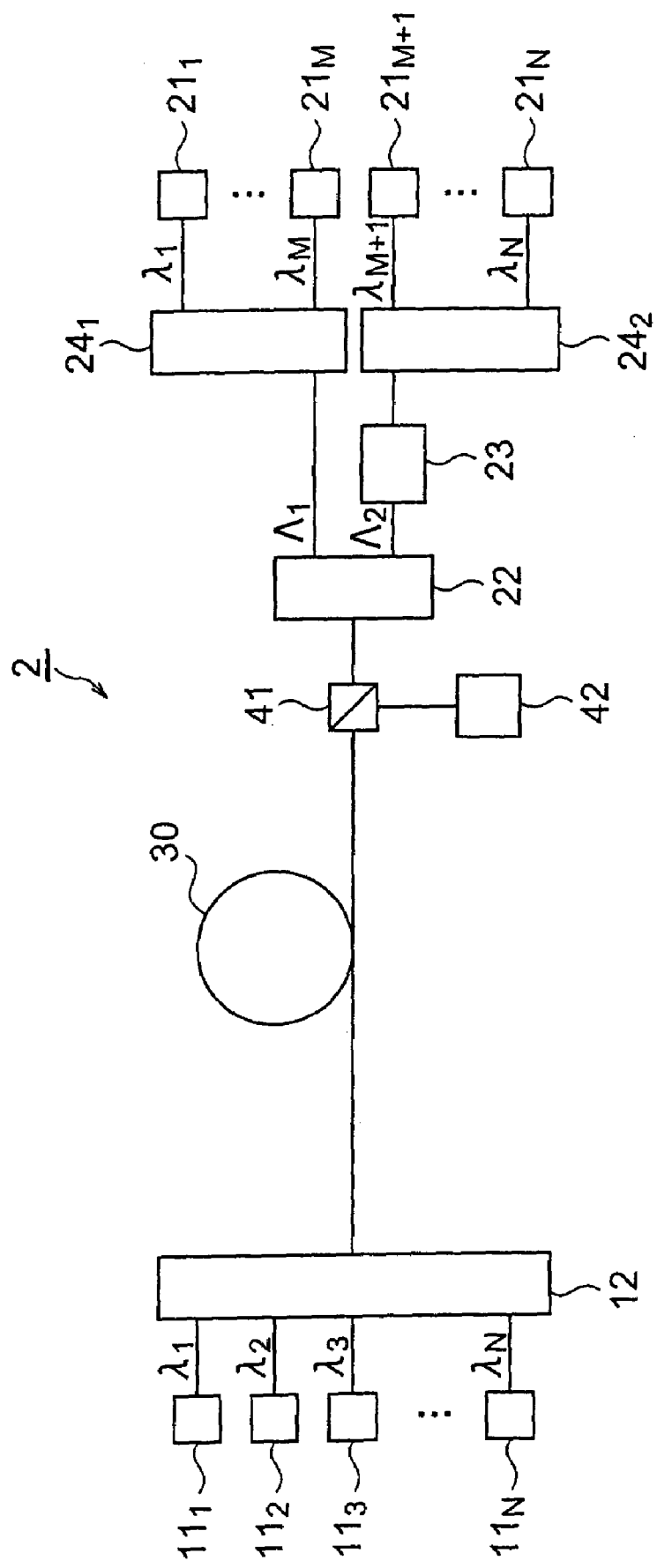
FIG. 6 is a diagram depicting the configuration of the second embodiment of the optical transmission system according to the present invention.

Now the second embodiment of the optical transmission system according to the present invention will be described. FIG. 6 is a diagram depicting the configuration of the optical transmission system 2 according to the second embodiment. The optical transmission system 2 shown in FIG. 6 further comprises an optical coupler 41 and an pumping light source 42, in addition to the configuration of the optical transmission system 1a according to the first embodiment (FIG. 1). In the following description, the dispersion compensator 23 is disposed at the signal emitting end side of the optical fiber transmission line 30, as shown in FIG. 6, but in the second embodiment, the dispersion compensator 23 may be disposed at the signal entering end side of the optical fiber transmission line 30, as shown in FIG. 2, as an application example. This second embodiment may have a configuration which allows hybrid transmission, where the transmission speed is different among the signal channels, as shown in FIG. 3, as another application example.

The pumping light source 42 outputs the Raman-amplification pumping light for Raman-amplifying the signal light into the optical fiber transmission line 30. The optical coupler 41 is disposed in the subsequent stage of the optical fiber transmission line 30 and in the previous stage of the demultiplexer 22, and supplies the pumping light, which is outputted from the pumping light source 42, into the optical fiber transmission line 30, and also outputs the multiplexed signal light reached from the optical fiber transmission line 30 into the multiplexer 22. It is preferable that the Raman-amplification pumping light includes a plurality of pumping channels in the wavelength range of 1.2 µm to 1.3 µm, and in this case, the multiplexed signal light in the wavelength range of 1.3 µm to 1.4 µm can be Raman-amplified. At this time, it is preferable that the optical fiber transmission line 30 has a transmission loss at a wavelength of 1.38 µm, which is smaller than the transmission loss at a wavelength of 1.31 µm.

The optical transmission system 2 operates as follows. The Raman-amplification pumping light, which is outputted from the pumping light source 42, is supplied into the optical fiber transmission line 30 through the optical coupler 41. Each signal channel with wavelength $\lambda_n$, which is outputted from each non-temperature controlled direct modulation light source $11_n$ which constitutes the optical transmitter, is multiplexed by the multiplexer 12, and the signal light (multiplexed signal light), where signal channels with wavelengths $\lambda_1$ to $\lambda_N$ are multiplexed, is sent from the multiplexer 12 to the optical fiber transmission line 30. While propagating through the optical fiber transmission line 30, the multiplexed signal light is Raman-amplified. And the signal channel included in the multiplexed signal light, which reaches from the optical fiber transmission line 30 to the demultiplexer 22 through the optical coupler 41, is demultiplexed into the signal channel group in the first wavelength $\Lambda_1$ and the signal channel group in the second wavelength band $\Lambda_2$ by the demultiplexer 22. The signal channel group (wavelengths $\lambda_1$ to $\lambda_M$) in the first wavelength band $\Lambda_1$, where the absolute value of chromatic dispersion is small, demultiplexed by the demultiplexer 22, is demultiplexed into each signal channel by the demultiplexer $24_1$, and is received by the corresponding receiver $21_1$ to $21_M$, respectively. The signal channel group (wavelengths $\lambda_{M+1}$ to $\lambda_N$) in the second wavelength band $\Lambda_2$, where the absolute value of chromatic dispersion is large, demultiplexed by the demultiplexer 22, is demultiplexed into each signal channel by the demultiplexer $24_2$ after dispersion is compensated by the non-temperature controlled dispersion compensator 23. And these demultiplexed signal channels (wavelengths $\lambda_{M+1}$ to $\lambda_N$) are received by the receivers $21_{M+1}$ to $21_N$, respectively.

The chromatic dispersion of one of the signal channels in the second wavelength band $\Lambda_2$ after passing through the dispersion compensator 23 (chromatic dispersion at the signal receiving ends of the receivers $21_{M+1}$ to $21_N$) is set to be negative in a temperature range of 0° C. to 60° C. Also the chromatic dispersion of all the signal channels in the second wavelength band $\Lambda_2$ after passing through the dispersion compensator 23 may be set to be negative in the temperature range of 0° C. to 60° C. It is preferable that at the signal receiving ends of the receivers $21_{M+1}$ to $21_N$, the optical power of one of the signal channels in the second wavelength band $\Lambda_2$ is set to be higher than the lowest optical power among the optical powers of the signal channels in the first wavelength band $\Lambda_1$. Also, it is preferable that, at the signal receiving ends of the receivers $21_{M+1}$ to $21_N$, the optical power of all the signal channels in the second wavelength band $\Lambda_2$ is set to be higher than the lowest optical power among the optical power of the signal channels in the first wavelength band $\Lambda_1$.

By implementing the above mentioned chromatic dispersion characteristic and loss characteristic, the optical transmission system 2 allows high quality transmission of multiplexed signal light including a plurality of signal channels in the signal wavelength band, and becomes a system suitable particularly for CWDM optical transmission. In this second embodiment as well, the dispersion compensator 23 is disposed only for the signal channels in the second wavelength band $\Lambda_2$ at one side, and the direct modulation light source $11_n$ and dispersion compensator 23 are non-temperature controlled devices, respectively, so system cost decreases. In CWDM optical transmission, the signal channel spacing is wide, so an inexpensive optical filter can be used as the demultiplexer 22. This second embodiment allows higher quality signal transmission by Raman-amplifying the signal channels in a wavelength band where the transmission loss of the optical fiber transmission line 30 is high.

Specifically, the optical fiber transmission line 30 is a non-zero-dispersion shifted optical fiber (NZDSF) where the loss peak due to an OH-radical near 1.38 µm is decreased. The assumed system is a system with dispersion resistance of 1200 ps/nm, which transmits 16-channel signal light (channel spacing of 20 nm) in the wavelength range of 1.31 µm to 1.61 µm at a bit rate of 2.5 Gb/s. The pumping channel wavelength of the Raman-amplification pumping light is 1.2 µm to 1.3 µm, and the multiplexed signal light near 1.3 µm is Raman-amplified. By this, the transmission distance, which is restricted by loss, can be expanded, or reception power is increased, therefore the system margin can be expanded. For example, when the pumping channel wavelength of the Raman-amplification pumping light is 1.23 µm and the optical power thereof is 24 dBm, the transmission distance at the wavelength of 1.33 µm can be 20 km or more longer.

Figure 7:
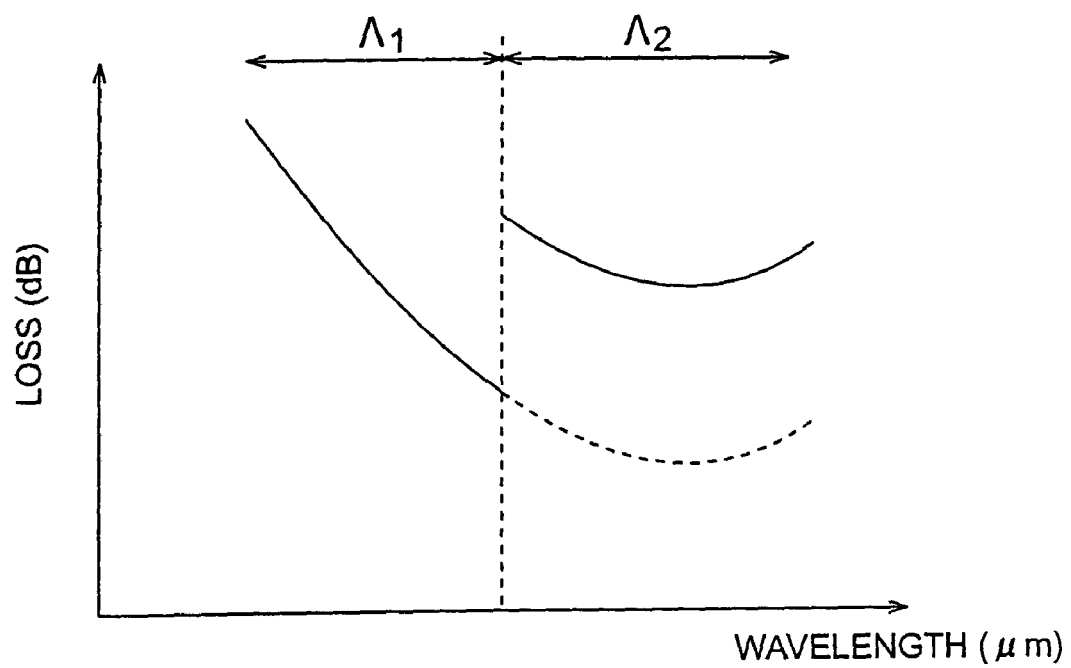
FIG. 7 is a graph depicting the loss characteristics of the optical fiber transmission line.

FIG. 7 is a graph depicting the loss characteristics of the optical fiber transmission line. As FIG. 7 shows, due to the insertion of the dispersion compensator 23, the transmission loss of all the signal channels in the second wavelength band $\Lambda_2$ increases. However, it is important that the transmission loss of all the signal channels in the signal wavelength band is at tolerance or less. In particular, when the transmission loss of all the signal channels in the second wavelength band $\Lambda_2$ is the same or less than the transmission loss near 1.3 µm, then the performance of the loss budget of the entire system does not deteriorate. As this second embodiment shows, high quality signal light transmission is possible by Raman-amplifying the signal light.

Third Embodiment

Figure 8:
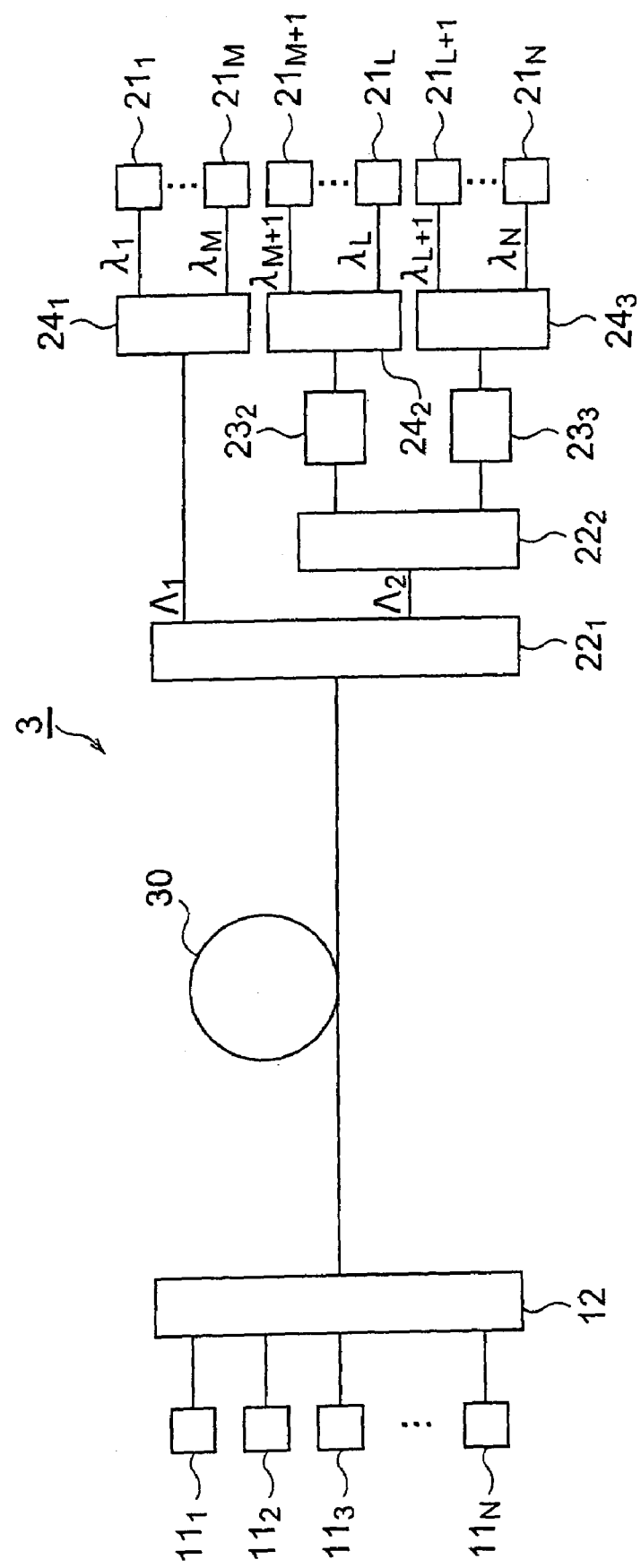
FIG. 8 is a diagram depicting the configuration of the third embodiment of the optical transmission system according to the present invention.

The third embodiment of the optical transmission system according to the present invention will now be described. FIG. 8 is a diagram depicting the configuration of the optical transmission system 3 according to the third embodiment. The optical transmission system 3 shown in FIG. 8 comprises N number of (N is an integer 2 or more) direct modulation light sources $11_1$ to $11_N$ (included in the optical transmitter), multiplexer 12, N number of receivers $21_1$ to $21_N$ (included in the optical receiver), demultiplexer $22_1$, demultiplexer $22_2$, dispersion compensator $23_2$, dispersion compensator $23_3$, demultiplexer $24_1$, demultiplexer $24_2$, demultiplexer $24_3$ and optical fiber transmission line 30. The following description is based on the configuration where the dispersion compensators $23_2$ and $23_3$ are disposed at the signal emitting end side of the optical fiber transmission line 30, as shown in FIG. 8, but in the third embodiment as well, the dispersion compensators $23_2$ and $23_3$ may be disposed at the signal entering end side of the optical fiber transmission line 30, as shown in FIG. 2, as an application example. Also in the third embodiment, a configuration which allows hybrid transmission, where the transmission speed is different among signal channels, as shown in FIG. 3, may be used as another application example.

Each direct modulation light source $11_n$ (n is an arbitrary integer 1 or more N or less) includes a non-temperature controlled semiconductor laser light source which outputs the directly modulated signal channels with wavelength $\lambda_n$. The multiplexer 12 multiplexes the signal channels with wavelength $\lambda_n$ which are outputted from the direct modulation light source $11_n$, and sends the signal light (multiplexed signal light), where signal channels with wavelengths $\lambda_1$ to $\lambda_N$ are multiplexed, to the optical fiber transmission line 30. The signal channel wavelengths $\lambda_1$ to $\lambda_N$ are included in the signal wavelength band from a wavelength of about 1.3 µm to a wavelength of about 1.61 µm, of which the channel spacing is relatively wide. In other words, the optical transmission system 3 according to the third embodiment is a system which performs CWDM optical transmission.

The optical fiber transmission line 30 guides to the demultiplexer $22_1$ the multiplexed signal light, including the signals channels with wavelengths $\lambda_1$ to $\lambda_N$, which are outputted from the multiplexer 12. It is preferable that this optical fiber transmission line 30 is a standard single-mode optical fiber having a zero-dispersion wavelength of near 1.3 µm that is suitable, or a non-zero-dispersion shifted optical fiber (NZDSF) having a zero-dispersion wavelength at wavelengths of 1.35 µm to 1.5 µm. It is also preferable that the optical fiber transmission line 30, at a wavelength of 1.38 µm, has a transmission loss smaller than a transmission loss at a wavelength of 1.31 µm.

The demultiplexer $22_1$ is disposed in the subsequent stage of the optical fiber transmission line 30, and demultiplexes the signal channels with wavelengths $\lambda_1$ to $\lambda_N$ propagating through the optical fiber transmission line 30 into the signal channel group in the first wavelength band $\Lambda_1$ and the signal channel group in the second wavelength band $\Lambda_2$. The first wavelength band $\Lambda_1$ is a wavelength band which includes the zero-dispersion wavelength of the optical fiber transmission line 30, and the second wavelength band $\Lambda_2$ is the other wavelength band. If the optical fiber transmission line 30 is a standard single-mode optical fiber, the second wavelength band $\Lambda_2$ is at the longer wavelength side from the first wavelength band $\Lambda_1$. The demultiplexer $22_2$ further demultiplexes the signal channels with wavelengths $\lambda_{M+1}$, to $\lambda_N$ (M is an integer 2 or more (N−1) or less) included in the second wavelength band $\Lambda_2$ demultiplexed by the demultiplexer $22_1$ into two signal channel groups.

The dispersion compensator $23_2$ is a non-temperature controlled device, and compensates for the chromatic dispersion of the signal channels with wavelengths $\lambda_{M+1}$ to $\lambda_L$ (L is an integer (M+2) or more (N−1) or less) among the signal channels in the second wavelength band $\Lambda_2$ demultiplexed by the demultiplexer $22_2$. The dispersion compensator $23_3$ is also a non-temperature controlled device, and compensates for the chromatic dispersion of the signal channels with wavelengths $\lambda_{L+1}$ to $\lambda_N$ among the signal channels of the second wavelength band $\Lambda_2$ demultiplexed by the demultiplexer $22_2$. These dispersion compensators $23_2$ and $23_3$ have chromatic dispersion with the opposite sign from the chromatic dispersion of the optical fiber transmission line 30 in each wavelength band, and a dispersion compensating optical fiber, for example, is suitable.

The demultiplexer $24_1$ demultiplexes the signal channels with wavelengths $\lambda_1$ to $\lambda_M$ included in the first wavelength band $\Lambda_1$ which are demultiplexed by the demultiplexer $22_1$. The demultiplexer $24_2$ demultiplexes the signal channels with wavelengths $\lambda_{M+1}$ to $\lambda_L$ among the signal channels in the second wavelength band $\Lambda_2$ for which the chromatic dispersion is compensated by the dispersion compensator $23_2$. The demultiplexer $24_3$ demultiplexes the signal channels with the wavelengths $\lambda_{L+1}$ to $\lambda_N$ among the signal channels with the second wavelength band $\Lambda_2$ for which the chromatic dispersion is compensated by the dispersion compensator $23_3$. Each receiver $21_n$ receives the signal channel with the wavelength $\lambda_n$, which is outputted from one of the demultiplexers $24_1$ to $24_3$.

This optical transmission system 3 operates as follows. The signal channels with wavelength $\lambda_n$, which is outputted from the non-temperature controlled direct modulation light sources $11_n$ respectively, are multiplexed by the multiplexer 12, and the signal light (multiplexed signal light), where the signal channels with wavelengths $\lambda_1$ to $\lambda_N$ are multiplexed, are sent from this multiplexer 12 to the optical fiber transmission line 30. The multiplexed signal light which reaches from the optical fiber transmission line 30 to the demultiplexer $22_1$ is demultiplexed into the signal channel group in the first wavelength band $\Lambda_1$ and the signal channel group in the second wavelength band $\Lambda_2$ by the demultiplexer $22_1$. The signal channels with wavelengths $\lambda_1$ to $\lambda_M$ included in the first wavelength band $\Lambda_1$, where the absolute value of chromatic is small, demultiplexed by the demultiplexer $22_1$, are demultiplexed by the demultiplexer $24_1$ respectively, and received by the receivers $21_1$ to $21_M$. The signal channels with wavelengths $\lambda_{M+1}$ to $\lambda_N$ included in the second wavelength band $\Lambda_2$, where the absolute value of chromatic dispersion is large, demultiplexed by the demultiplexer $22_1$, on the other hand, are further demultiplexed into two signal channels with two wavelength bands by the demultiplexer $22_2$, and the chromatic dispersion is compensated by the non-temperature controlled dispersion compensators $23_2$ and $23_3$. Then the signal channels whose the chromatic dispersion is compensated are demultiplexed by the demultiplexers $24_2$ and $24_3$ respectively, and received by the corresponding receivers $21_{M+1}$ to $21_N$.

At this time, chromatic dispersion of one of the signal channels in the second wavelength band $\Lambda_2$ after passing through the dispersion compensators $23_2$ and $23_3$ (chromatic dispersion at the signal receiving ends of the receivers $21_{M+1}$ to $21_N$) is set to be negative in a temperature range of 0° C. to 60° C. It is also preferable that the chromatic dispersion of all the signal channels in the second wavelength band $\Lambda_2$, after passing through the dispersion compensators $23_2$ and $23_3$, is set to be negative in a temperature range 0° C. to 60° C.

It is also preferable that at the signal receiving ends of the receivers $21_{M+1}$ to $21_N$, the optical power of one of the signal channels in the second wavelength band $\Lambda_2$ is set to be higher than the lowest optical power among the optical power of signal channels included in the first wavelength band $\Lambda_1$. It is also preferable that at the signal receiving ends of the receivers $21_{M+1}$ to $21_N$, the optical powers of all the signal channels in the second wavelength band $\Lambda_2$ is set to be higher than the lowest optical power among the optical powers of all the signal channels in the first wavelength band $\Lambda_1$.

By having the above mentioned chromatic dispersion characteristic and loss characteristic, the optical transmission system 3 allows high quality transmission of a plurality of signal channels included in the signal wavelength band, and is suitable particularly for CWDM optical transmission. In this third embodiment as well, the dispersion compensators $23_2$ and $23_3$ are disposed only for the signal channels in the second wavelength band $\Lambda_2$ at one side, and the direct modulation light sources $11_n$ and the dispersion compensators 23 are non-temperature controlled devices respectively, so system cost decreases. Also in CWDM optical transmission, the signal channel spacing is wide, so inexpensive optical filters can be used as the demultiplexers $22_1$ and $22_2$. Particularly in this third embodiment, the signal channels included in the second wavelength band $\Lambda_2$ are demultiplexed into two wavelength bands, and a dispersion compensator is disposed for each one of the demultiplexed signal channel groups, so a higher quality optical transmission of signals becomes possible. Also the loss requirement characteristics for the dispersion compensators $23_2$ and $23_3$ are relaxed, so system design is easy.

Figures 9, 10:
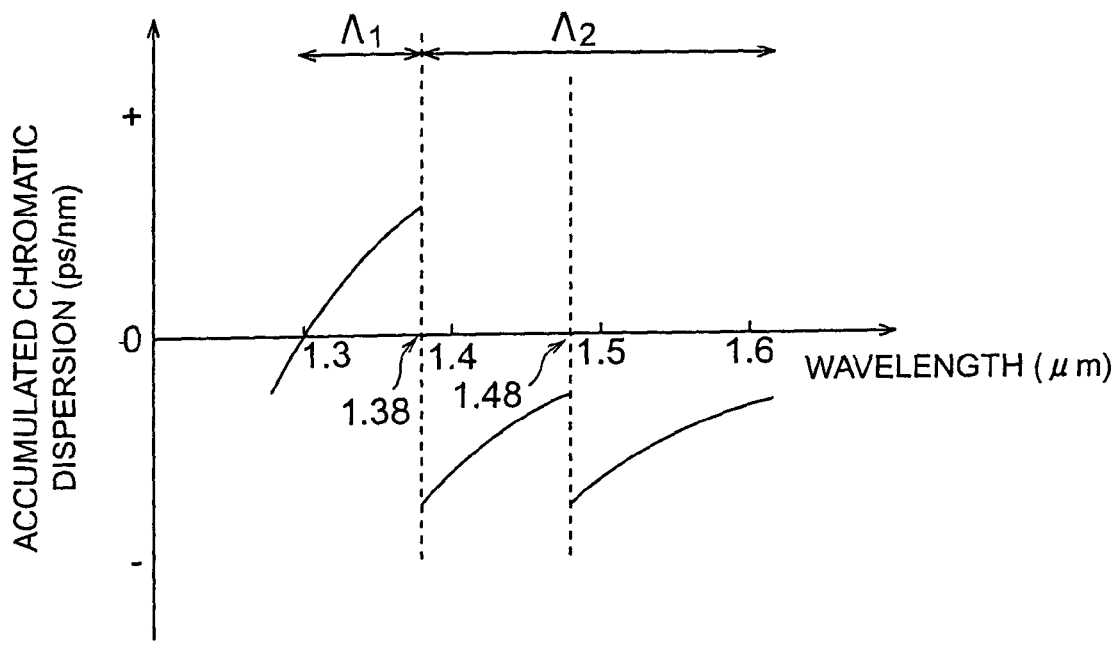
FIG. 9 is a graph depicting the chromatic dispersion characteristics and the loss characteristics of the optical transmission system according to the third embodiment shown in FIG. 8.
FIG. 10 is a table showing the chromatic dispersion characteristics of Example 1 of the optical transmission system according to the present invention.

FIG. 9 is a graph depicting the chromatic dispersion characteristics of the optical transmission system 3 according to the third embodiment. When the dispersion compensators $23_2$ and $23_3$ are not disposed, accumulated chromatic dispersion exceeds the dispersion resistance depending on the wavelength. However in the optical transmission system 3 according to the third embodiment, each signal channel included in the second wavelength band $\Lambda_2$ (wavelengths of 1.4 μm to 1.61 μm), where the absolute value of chromatic dispersion is large in the optical fiber transmission line 30, is dispersion-compensated by the dispersion compensators $23_2$ and $23_3$. By this, the accumulated chromatic dispersion of the entire system becomes negative.

EXAMPLES

Now specific examples 1 to 3 of the optical transmission system 1 according to the first embodiment will be described. In all of these examples, the wavelengths of the signal channels are 1275 nm, 1300 nm, 1325 nm, 1350 nm, 1530 nm, 1550 nm, 1570 nm and 1590 nm. The second wavelength band $\Lambda_2$ includes the channel wavelengths of 1530 nm to 1590 nm.

In Example 1, the optical fiber transmission line 30 is a standard single-mode optical fiber with a length of 100 km. The dispersion compensator 23 is a dispersion compensating optical fiber having a chromatic dispersion of −120 ps/nm/km, a dispersion slope of −0.4 ps/nm$^2$/km, and a transmission loss of 0.5 dB/km, as the characteristics at a wavelength of 1.55 μm. The bit rate is 2.5 Gb/s. And the chromatic dispersion characteristics of the entire system was evaluated while changing the length of the dispersion compensating optical fiber. FIG. 10 is a table showing the chromatic dispersion characteristic of Example 1. This table shows the length (km) of the dispersion compensating optical fiber, the maximum value (ps/nm) of the accumulated chromatic dispersion in the second wavelength band $\Lambda_2$, and the worst transmission penalty (dB) in the second wavelength band $\Lambda_2$. When the dispersion compensating optical fiber has a length of 7 km, the maximum value of the accumulated chromatic dispersion in the second wavelength band $\Lambda_2$ is about 1000 ps/nm, and the worst transmission penalty is 1.0 dB. When the dispersion compensating optical fiber has a length of 14 km, the maximum value of the accumulated chromatic dispersion in the second wavelength band $\Lambda_2$ is about 20 ps/nm, and the worst transmission penalty is 0.1 dB. When of the dispersion compensating optical fiber has a length of 14.3 km, the maximum value of the accumulated chromatic dispersion in the second wavelength band $\Lambda_2$ is about −20 ps/nm, and the worst transmission penalty is −0.1 dB. When the dispersion compensating optical fiber has a length of 15 km, the maximum value of the accumulated chromatic dispersion in the second wavelength band $\Lambda_2$ is about −100 ps/nm, and the worst transmission penalty is −0.2 dB. In other words, when the dispersion compensating optical fiber has a length of 14.3 km or 15 km, the accumulated chromatic dispersion becomes negative in the entire signal wavelength band of the second wavelength band $\Lambda_2$, and the transmission penalty improves compared with a configuration where the optical transmitter and the optical receiver are directly connected by the optical fiber transmission line.

In Example 2, the optical fiber transmission line 30 is a non-zero-dispersion shifted optical fiber (NZDSF) with a length of 125 km. This non-zero-dispersion shifted optical fiber has an 8 ps/nm/km chromatic dispersion, a 0.06 ps/nm²/km dispersion slope and a 0.2 dB/km transmission loss as characteristics at a wavelength of 1.55 μm. The dispersion compensator 23 is a dispersion compensating optical fiber having a chromatic dispersion of −100 ps/nm/km, a dispersion slope of −0.6 ps/nm²/km and a transmission loss of 0.52 dB/km, as characteristics at a wavelength of 1.55 μm. The bit rate is 2.5 Gb/s. And the chromatic dispersion characteristics of the entire system was evaluated while changing the length of the dispersion compensating optical fiber. FIG. 11 is a table showing the chromatic dispersion characteristics of Example 2. For each signal channel wavelength, the length (km) of the dispersion compensating optical fiber, the maximum value (ps/nm) of the accumulated chromatic dispersion and the transmission penalty (dB) are shown. As this table shows, the transmission penalty is negative when the accumulated chromatic dispersion is negative at any one of the signal channel wavelengths.

In Example 2, when the length of the dispersion compensating optical fiber is 5 km, 9 km, 10 km, 10.5 km, 11 km and 15 km, the maximum value of the accumulated chromatic dispersion at the signal channel wavelength of 1530 nm is 410 ps/nm, 58 ps/nm, −30 ps/nm, −70 ps/nm, −119 ps/nm and −462 ps/nm respectively, and the transmission penalty is 0.5 dB, 0.1 dB, −0.1 dB, −0.2 dB, −0.2 dB and −0.2 dB respectively.

When the length of the dispersion compensating optical fiber is 5 km, 9 km, 10 km, 10.5 km, 11 km and 15 km, the maximum value of the accumulated chromatic dispersion at the signal channel wavelength of 1550 nm is 501 ps/nm, 99 ps/nm, 1 ps/nm, −47 ps/nm, −102 ps/nm and −493 ps/nm respectively, and the transmission penalty is 0.5 dB, 0.2 dB, 0.1 dB, −0.1 dB, −0.2 dB and −0.3 dB respectively.

When the length of the dispersion compensating optical fiber is 5 km, 9 km, 10 km, 10.5 km, 11 km and 15 km, the maximum value of the accumulated chromatic dispersion at the signal channel wavelength of 1570 nm is 585 ps/nm, 134 ps/nm, 25 ps/nm, −31 ps/nm, −94 ps/nm and −541 ps/nm, and the transmission penalty is 0.6 dB, 0.3 dB, 0.1 dB, −0.1 dB, −0.2 dB and −0.3 dB respectively.

When the length of the dispersion compensating optical fiber is 5 km, 9 km, 10 km, 10.5 km, 11 km and 15 km, the maximum value of the accumulated chromatic dispersion at the signal channel wavelength of 1590 nm is 671 ps/nm, 177 ps/nm, 54 ps/nm, −4 ps/nm, −71 ps/nm and −572 ps/nm respectively, and the transmission penalty is 0.7 dB, 0.3 dB, 0.1 dB, 0 dB, −0.2 dB and −0.3 dB respectively.

In Example 3, the optical fiber transmission line 30 and the dispersion compensator 23 (dispersion compensating optical fiber), similar to Example 2, are applied. The bit rate is 10 Gb/s. And the chromatic dispersion characteristics of the entire system was evaluated while changing the length of the dispersion compensating optical fiber. FIG. 12 is a table showing the transmission penalty characteristics of Example 3. This table shows the length of the dispersion compensating optical fiber (km) and the transmission penalty (dB) for each signal channel wavelength. As this table shows, the accumulated chromatic dispersion is negative, and the transmission penalty is negative at any signal channel wavelength, because the length of the dispersion compensating optical fiber is set appropriately.

In Example 3, when the length of the dispersion compensating optical fiber is 9 km, 10 km, 10.5 km and 11 km, the transmission penalty at the signal channel wavelength of 1530 nm is 0.8 dB, −0.1 dB, −0.2 dB and −0.3 dB respectively. When the length of the dispersion compensating optical fiber is 9 km, 10 km, 10.5 km and 11 km, the transmission penalty at the signal channel wavelength of 1550 nm is 1.1 dB, 0.1 dB, −0.1 dB and −0.3 dB respectively. When the length of the dispersion compensating optical fiber is 9 km, 10 km, 10.5 km and 11 km, the transmission penalty at the signal channel wavelength of 1570 nm is 1.7 dB, 0.3 dB, −0.1 dB and −0.3 dB respectively. And when the length of the dispersion compensating optical fiber is 9 km, 10 km, 10.5 km and 11 km, the transmission penalty at the 4 signal channel wavelength of 1590 nm is 3.1 dB, 0.6 dB, 0 dB and −0.2 dB respectively.

Figure 13A:
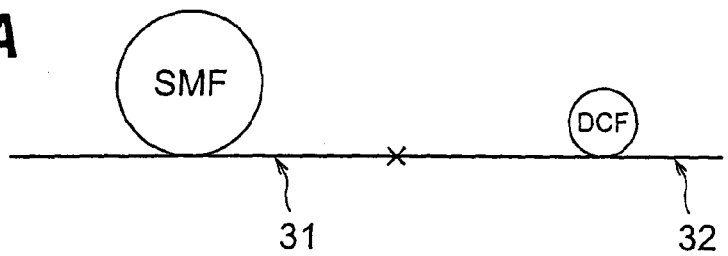
FIG. 13A is a diagram depicting an experimental system for evaluating the temperature characteristic of the optical transmission system according to the present invention.

Now the temperature characteristic of the optical transmission system according to the present invention will be evaluated. FIG. 13A is a diagram depicting the experimental system prepared for this evaluation, and FIGS. 13B and 13C are graphs depicting the optical characteristics of this experimental system.

The experimental system prepared for evaluation is comprised of a single-mode optical fiber 31 as the optical fiber transmission line, and a dispersion compensating optical fiber 32 as the dispersion compensator, which are connected by fusing, as shown in FIG. 13A. The provided single-mode optical fiber 31 has a 17 ps/nm/km chromatic dispersion $D_{SMF}$, and a 0.06 ps/nm²/km dispersion slope $DS_{SMF}$ as characteristics at the temperature of 30° C. and wavelength of 1540 nm. The provided dispersion compensating optical fiber 32 has a chromatic dispersion $D_{DCF}$ of −130 ps/nm/km and a dispersion slope $DS_{DCF}$ of −0.43 ps/nm²/km, as characteristics at the temperature of 30° C. and wavelength of 1540 nm.

Figure 13B:
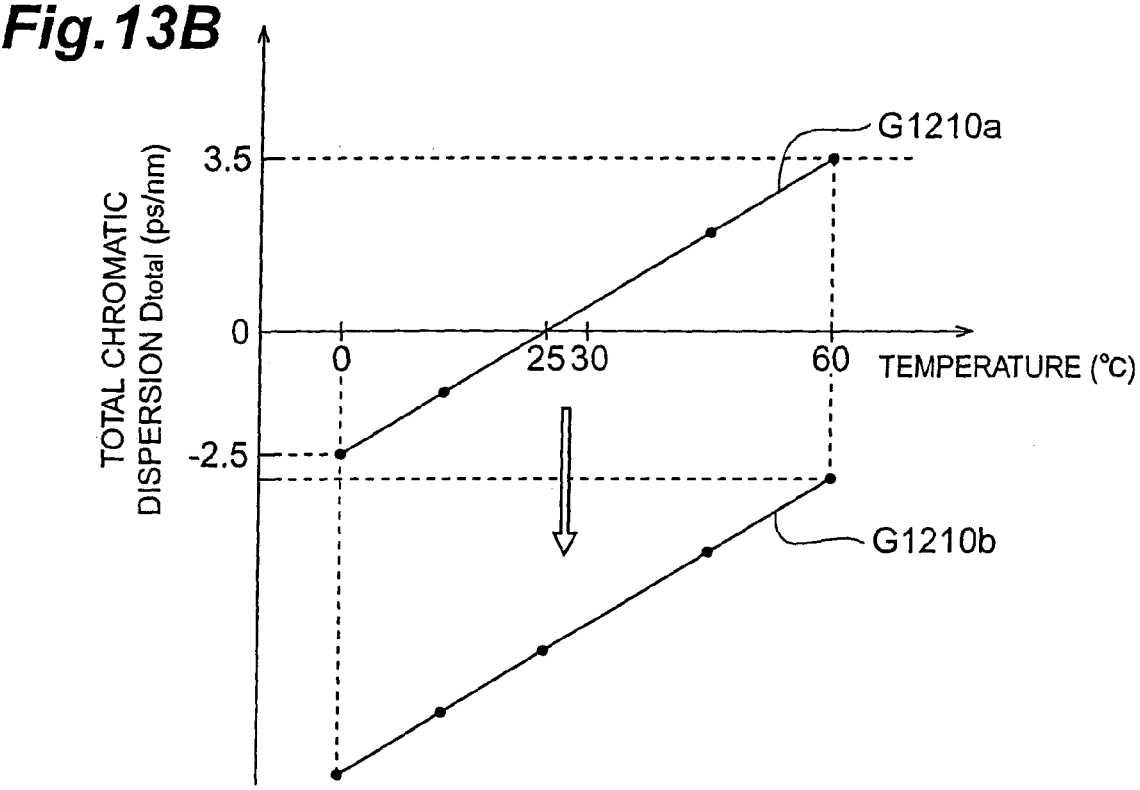
FIGS. 13B and 13C are graphs showing the optical characteristics of this experimental system.
Figure 13C:
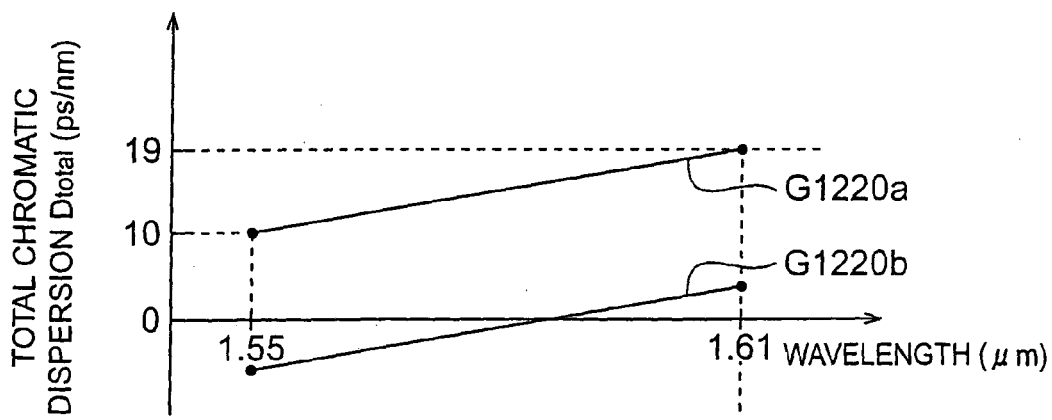

In FIG. 13B, the graph G1210a shows the accumulated chromatic dispersion (total chromatic dispersion $D_{total}$ (ps/nm)) characteristics of the first comparison example, which is constituted by a single-mode optical fiber with a length of 80 km and a dispersion compensating optical fiber with a length of 10.5 km, and the graph G1210b shows the accumulated chromatic dispersion (total chromatic dispersion $D_{total}$ (ps/nm)) characteristic of the present example, which is constituted by a single-mode optical fiber with a length 80 km and a dispersion compensating optical fiber having a longer fiber length than this first comparison example. As FIG. 13B shows, according to the second comparison example, the total chromatic dispersion $D_{total}$ becomes positive when the temperature exceeds 30° C., but according to the present example, the fiber length of the dispersion compensating optical fiber is set long, so that the total chromatic dispersion $D_{total}$ becomes negative at least in a temperature range of 0° C. to 60° C. By this, the change of the transmission characteristic can be sufficiently prevented, even in an actual operation environment.

The present inventor also considering a second comparison example, which is constituted by a single-mode optical fiber with a length of 80 km and a dispersion is compensating optical fiber, which has a positive dispersion slope as a characteristic at the temperature of 30° C. and wavelength of 1540 nm. In FIG. 13C, the graph G1220a shows the accumulated chromatic dispersion (total chromatic dispersion $D_{total}$ (ps/nm)) of the second comparison example at 60° C., and graph G1220b shows the accumulated chromatic dispersion (total chromatic dispersion $D_{total}$ (ps/nm) characteristic of the second comparison example at 0° C.

As FIG. 13C shows, according to the second comparison example, the total chromatic dispersion $D_{total}$ at a wavelength of 1610 nm becomes positive in a 0° C. operating environment, even if the total chromatic dispersion $D_{total}$ at a wavelength of 1550 nm is negative. At 60° C., the total chromatic dispersion $D_{total}$ becomes 19 ps/nm. In this case, deterioration of the transmission characteristic becomes conspicuous at a bit rate of 10 Gb/s high-speed optical transmission at a wavelength of 1610 nm.

As described above, according to the present invention, signal light can be transmitted at high quality. Also the direct modulation light source and dispersion compensator to be applied are non-temperature controlled devices respectively, so system cost decreases.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A CWDM (Coarse Wavelength Division Multiplexing) optical transmission system, comprising:
    an optical transmitter including a non-temperature controlled direct modulation light source, said optical transmitter outputting signal light in a signal wavelength band;
    an optical receiver receiving the signal light outputted from said optical transmitter;
    an optical fiber transmission line for transmitting the signal light outputted from said optical transmitter as a transmission medium provided between said optical transmitter and said optical receiver, said optical fiber transmission line having a positive chromatic dispersion at an operation wavelength of said direct modulation light source; and
    at least one non-temperature controlled dispersion compensator provided on an optical path between the signal outputting end of said optical transmitter and the signal entering end of said optical fiber transmission line,
    wherein, at the signal emitting end of said optical fiber transmission line, the accumulated chromatic dispersion at the operation wavelength is set to negative over a temperature range of 0° C. to 60° C.,
    the optical transmission system further comprising a demultiplexer for demultiplexing a plurality of signal channels propagating through said optical fiber transmission line into one signal channel group in a first wavelength band including a zero-dispersion wavelength of said optical fiber transmission line and the other signal channel group in a second wavelength band,
    wherein said dispersion compensator compensates for the accumulated chromatic dispersion in the signal channel group of the second wavelength band,
    wherein, at the signal outputting end of said dispersion compensator, the accumulated chromatic dispersion in one of the signal channels of the second wavelength band passing through said dispersion compensator is negative over the temperature range of 0° C. to 60° C., and
    wherein a bit rate of at least one signal channel among the signal channels included in the second wavelength band is higher than any bit rate of all the signal channels in the first wavelength band.

2. The CWDM optical transmission system according to claim 1, wherein said optical fiber transmission line includes a single-mode optical fiber having a zero-dispersion wavelength of near 1.3 μm.

3. The CWDM optical transmission system according to claim 1, wherein said optical fiber transmission line, at a wavelength of 1.38 μm, has a transmission loss smaller than a transmission loss at a wavelength of 1.31 μm.

4. The CWDM optical transmission system according to claim 1, wherein said optical fiber transmission line has a zero-dispersion wavelength which exists in a wavelength range of 1.35 μm to 1.5 μm.

5. The CWDM optical transmission system according to claim 1, further comprising pumping light supply means for supplying Raman-amplification pumping light into said optical fiber transmission line, so as to Raman-amplify the signal light propagating through said optical fiber transmission line.

6. The CWDM optical transmission system according to claim 5, wherein said pumping light supply means supplies the Raman-amplification pumping light of a plurality of pumping channels included in a wavelength range of 1.2 μm to 1.3 μm into said optical fiber transmission line.

7. The CWDM optical transmission system according to claim 1, wherein, at the signal outputting end of said dispersion compensator, the accumulated chromatic dispersion in all the signal channels of the second wavelength band passing through said dispersion compensator is negative over the temperature range of 0° C. to 60° C.

8. A CWDM (Coarse Wavelength Division Multiplexing) optical transmission system, comprising:
    an optical transmitter including a non-temperature controlled direct modulation light source, said optical transmitter outputting signal light in a signal wavelength band;
    an optical receiver receiving the signal light outputted from said optical transmitter;
    an optical fiber transmission line for transmitting the signal light outputted from said optical transmitter as a transmission medium provided between said optical transmitter and said optical receiver, said optical fiber transmission line having a positive chromatic dispersion at an operation wavelength of said direct modulation light source; and
    at least one non-temperature controlled dispersion compensator provided on an optical path between the signal outputting end of said optical transmitter and the signal entering end of said optical fiber transmission line,
    wherein, at the signal emitting end of said optical fiber transmission line, the accumulated chromatic dispersion at the operation wavelength is set to negative over a temperature range of 0° C. to 60° C.,
    the optical transmission system further comprising a demultiplexer for demultiplexing a plurality of signal channels propagating through said optical fiber transmission line into one signal channel group in a first wavelength band including a zero-dispersion wavelength of said optical fiber transmission line and the other signal channel group in a second wavelength band, wherein said dispersion compensator compensates for the accumulated chromatic dispersion in the signal channel group of the second wavelength band, wherein, at the signal outputting end of said dispersion compensator, the accumulated chromatic dispersion in one of the signal channels of the second wavelength band passing through said dispersion compensator is negative over the temperature range of 0° C. to 60° C., and wherein, at the signal receiving end of said optical receiver, the optical power of one of the signal channels in the second wavelength band is higher than the lowest optical power among the optical powers of the signal channels in the first wavelength band.

9. The CWDM optical transmission system according to claim 8, wherein, at the signal outputting end of said dispersion compensator, the accumulated chromatic dispersion in all the signal channels of the second wavelength band passing through said dispersion compensator is negative over the temperature range of 0° C. to 60° C.

10. The CWDM optical transmission system according to claim 8, wherein said optical fiber transmission line includes a single-mode optical fiber having a zero-dispersion wavelength of near 1.3 µm.

11. The CWDM optical transmission system according to claim 8, wherein said optical fiber transmission line, at a wavelength of 1.38 µm, has a transmission loss smaller than a transmission loss at a wavelength of 1.31 µm.

12. The CWDM optical transmission system according to claim 8, wherein said optical fiber transmission line has a zero-dispersion wavelength which exists in a wavelength range of 1.35 µm to 1.5 µm.

13. The CWDM optical transmission system according to claim 8, further comprising pumping light supply means for supplying Raman-amplification pumping light into said optical fiber transmission line, so as to Raman-amplify the signal light propagating through said optical fiber transmission line.

14. The CWDM optical transmission system according to claim 13, wherein said pumping light supply means supplies the Raman-amplification pumping light of a plurality of pumping channels included in a wavelength range of 1.2 µm to 1.3 µm into said optical fiber transmission line.

15. A CWDM (Coarse Wavelength Division Multiplexing) optical transmission system, comprising:
an optical transmitter including a non-temperature controlled direct modulation light source, said optical transmitter outputting signal light in a signal wavelength band;
an optical receiver receiving the signal light outputted from said optical transmitter;
an optical fiber transmission line for transmitting the signal light outputted from said optical transmitter as a transmission medium provided between said optical transmitter and said optical receiver, said optical fiber transmission line having a positive chromatic dispersion at an operation wavelength of said direct modulation light source; and
at least one non-temperature controlled dispersion compensator provided on an optical path between the signal outputting end of said optical transmitter and the signal entering end of said optical fiber transmission line, wherein, at the signal emitting end of said optical fiber transmission line, the accumulated chromatic dispersion at the operation wavelength is set to negative over a temperature range of 0° C. to 60° C., the optical transmission system further comprising a demultiplexer for demultiplexing a plurality of signal channels propagating through said optical fiber transmission line into one signal channel group in a first wavelength band including a zero-dispersion wavelength of said optical fiber transmission line and the other signal channel group in a second wavelength band, wherein said dispersion compensator compensates for the accumulated chromatic dispersion in the signal channel group of the second wavelength band, wherein, at the signal outputting end of said dispersion compensator, the accumulated chromatic dispersion in one of the signal channels of the second wavelength band passing through said dispersion compensator is negative over the temperature range of 0° C. to 60° C., and wherein, at the signal receiving end of said optical receiver, the optical power of all the signal channels in the second wavelength band is higher than the lowest optical power among the optical powers of the signal channel group in the first wavelength band.

16. The CWDM optical transmission system according to claim 15, wherein, at the signal outputting end of said dispersion compensator, the accumulated chromatic dispersion in all the signal channels of the second wavelength band passing through said dispersion compensator is negative over the temperature range of 0° C. to 60° C.

17. The CWDM optical transmission system according to claim 15, wherein said optical fiber transmission line includes a single-mode optical fiber having a zero-dispersion wavelength of near 1.3 µm.

18. The CWDM optical transmission system according to claim 15, wherein said optical fiber transmission line, at a wavelength of 1.38 µm, has a transmission loss smaller than a transmission loss at a wavelength of 1.31 µm.

19. The CWDM optical transmission system according to claim 15, wherein said optical fiber transmission line has a zero-dispersion wavelength which exists in a wavelength range of 1.35 µm to 1.5 µm.

20. The CWDM optical transmission system according to claim 15, further comprising pumping light supply means for supplying Raman-amplification pumping light into said optical fiber transmission line, so as to Raman-amplify the signal light propagating through said optical fiber transmission line.

21. The CWDM optical transmission system according to claim 20, wherein said pumping light supply means supplies the Raman-amplification pumping light of a plurality of pumping channels included in a wavelength range of 1.2 µm to 1.3 µm into said optical fiber transmission line.

22. A CWDM (Coarse Wavelength Division Multiplexing) optical transmission system, comprising:
an optical transmitter including a non-temperature controlled direct modulation light source, said optical transmitter outputting signal light in a signal wavelength band;
an optical receiver receiving the signal light outputted from said optical transmitter;
an optical fiber transmission line for transmitting the signal light outputted from said optical transmitter as a transmission medium provided between said optical transmitter and said optical receiver, said optical fiber transmission line having a positive chromatic dispersion at an operation wavelength of said direct modulation light source; and
at least one non-temperature controlled dispersion compensator provided on an optical path between the signal receiving end of said optical receiver and the signal emitting end of said optical fiber transmission line, wherein, at the signal receiving end of said optical receiver, the accumulated chromatic dispersion at the operation wavelength is set to negative over a temperature range of 0° C. to 60° C., the optical transmission system further comprising a demultiplexer for demultiplexing a plurality of signal channels propagating through said optical fiber transmission line into one signal channel group in a first wavelength band including a zero-dispersion wavelength of said optical fiber transmission line and the other signal channel group in a second wavelength band, wherein said dispersion compensator compensates for the chromatic dispersion in the signal channel group of the second wavelength band, wherein, at the signal outputting end of said dispersion compensator, the accumulated chromatic dispersion in one of the signal channels of the second wavelength band passing through said dispersion compensator is negative over the temperature range of 0° C. to 60° C., and wherein a bit rate of at least one signal channel among the signal channels included in the second wavelength band is higher than any bit rate of all the signal channels in the first wavelength band.

23. The CWDM optical transmission system according to claim 22, wherein said optical fiber transmission line includes a single-mode optical fiber having a zero-dispersion wavelength of near 1.3 µm.

24. The CWDM optical transmission system according to claim 22, wherein said optical fiber transmission line, at a wavelength of 1.38 µm, has a transmission loss smaller than a transmission loss at a wavelength of 1.31 µm.

25. The CWDM optical transmission system according to claim 22 wherein said optical fiber transmission line has a zero-dispersion wavelength which exists in a wavelength range of 1.35 µm to 1.5 µm.

26. The CWDM optical transmission system according to claim 22 further comprising pumping light supply means for supplying Raman-amplification pumping light into said optical fiber transmission line, so as to Raman-amplify the signal light propagating through said optical fiber transmission line.

27. The CWDM optical transmission system according to claim 26, wherein said pumping light supply means supplies the Raman-amplification pumping light of a plurality of pumping channels included in a wavelength range of 1.2 µm to 1.3 µm into said optical fiber transmission line.

28. The CWDM optical transmission system according to claim 22 wherein, at the signal outputting end of said dispersion compensator, the chromatic dispersion in all the signal channels of the second wavelength band passing through said dispersion compensator is negative over the temperature range of 0° C. to 60° C.

29. A CWDM (Coarse Wavelength Division Multiplexing) optical transmission system, comprising:
an optical transmitter including a non-temperature controlled direct modulation light source, said optical transmitter outputting signal light in a signal wavelength band;
an optical receiver receiving the signal light outputted from said optical transmitter;
an optical fiber transmission line for transmitting the signal light outputted from said optical transmitter as a transmission medium provided between said optical transmitter and said optical receiver, said optical fiber transmission line having a positive chromatic dispersion at an operation wavelength of said direct modulation light source; and at least one non-temperature controlled dispersion compensator provided on an optical path between the signal receiving end of said optical receiver and the signal emitting end of said optical fiber transmission line, wherein, at the signal receiving end of said optical receiver, the accumulated chromatic dispersion at the operation wavelength is set to negative over a temperature range of 0° C. to 60° C., the optical transmission system further comprising a demultiplexer for demultiplexing a plurality of signal channels propagating through said optical fiber transmission line into one signal channel group in a first wavelength band including a zero-dispersion wavelength of said optical fiber transmission line and the other signal channel group in a second wavelength band, wherein said dispersion compensator compensates for the chromatic dispersion in the signal channel group of the second wavelength band, wherein, at the signal outputting end of said dispersion compensator, the accumulated chromatic dispersion in one of the signal channels of the second wavelength band passing through said dispersion compensator is negative over the temperature range of 0° C. to 60° C., and wherein, at the signal receiving end of said optical receiver, the optical power of one of the signal channels in the second wavelength band is higher than the lowest optical power among the optical powers of the signal channels in the first wavelength band.

30. The CWDM optical transmission system according to claim 29 wherein, at the signal outputting end of said dispersion compensator, the chromatic dispersion in all the signal channels of the second wavelength band passing through said dispersion compensator is negative over the temperature range of 0° C. to 60° C.

31. The CWDM optical transmission system according to claim 29, wherein said optical fiber transmission line includes a single-mode optical fiber having a zero-dispersion wavelength of near 1.3 µm.

32. The CWDM optical transmission system according to claim 29, wherein said optical fiber transmission line, at a wavelength of 1.38 µm, has a transmission loss smaller than a transmission loss at a wavelength of 1.31 µm.

33. The CWDM optical transmission system according to claim 29, wherein said optical fiber transmission line has a zero-dispersion wavelength which exists in a wavelength range of 1.35 µm to 1.5 µm.

34. The CWDM optical transmission system according to claim 29, further comprising pumping light supply means for supplying Raman-amplification pumping light into said optical fiber transmission line, so as to Raman-amplify the signal light propagating through said optical fiber transmission line.

35. The CWDM optical transmission system according to claim 34, wherein said pumping light supply means supplies the Raman-amplification pumping light of a plurality of pumping channels included in a wavelength range of 1.2 µm to 1.3 µm into said optical fiber transmission line.

36. A CWDM optical transmission system, comprising:
an optical transmitter including a non-temperature controlled direct modulation light source, said optical transmitter outputting signal light in a signal wavelength band;
an optical receiver receiving the signal light outputted from said optical transmitter;

an optical fiber transmission line for transmitting the signal light outputted from said optical transmitter as a transmission medium provided between said optical transmitter and said optical receiver, said optical fiber transmission line having a positive chromatic dispersion at an operation wavelength of said direct modulation light source; and at least one non-temperature controlled dispersion compensator provided on an optical path between the signal receiving end of said optical receiver and the signal emitting end of said optical fiber transmission line, wherein, at the signal receiving end of said optical receiver, the accumulated chromatic dispersion at the operation wavelength is. set to negative over a temperature range of 0° C. to 60° C., the optical transmission system further comprising a demultiplexer for demultiplexing a plurality of signal channels propagating through said optical fiber transmission line into one signal channel group in a first wavelength band including a zero-dispersion wavelength of said optical fiber transmission line and the other signal channel group in a second wavelength band, wherein said dispersion compensator compensates for the chromatic dispersion in the signal channel group of the second wavelength band, wherein, at the signal outputting end of said dispersion compensator, the accumulated chromatic dispersion in one of the signal channels of the second wavelength band passing through said dispersion compensator is negative over the temperature range of 0° C. to 60° C., and wherein, at the signal receiving end of said optical receiver, the optical power of all the signal channels in the second wavelength band is higher than the lowest optical power among the optical powers of the signal channel group in the first wavelength band.

37. The CWDM optical transmission system according to claim 36, wherein, at the signal outputting end of said dispersion compensator, the chromatic dispersion in all the signal channels of the second wavelength band passing through said dispersion compensator is negative over the temperature range of 0° C. to 60° C.

38. The CWDM optical transmission system according to claim 36, wherein said optical fiber transmission line includes a single-mode optical fiber having a zero-dispersion wavelength of near 1.3 μm.

39. The CWDM optical transmission system according to claim 36, wherein said optical fiber transmission line, at a wavelength of 1.38 μm, has a transmission loss smaller than a transmission loss at a wavelength of 1.31 μm.

40. The CWDM optical transmission system according to claim 36, wherein said optical fiber transmission line has a zero-dispersion wavelength which exists in a wavelength range of 1.35 μm to 1.5 μm.

41. The CWDM optical transmission system according to claim 36, further comprising pumping light supply means for supplying Raman-amplification pumping light into said optical fiber transmission line, so as to Raman-amplify the signal light propagating through said optical fiber transmission line.

42. The CWDM optical transmission system according to claim 41, wherein said pumping light supply means supplies the Raman-amplification pumping light of a plurality of pumping channels included in a wavelength range of 1.2 μm to 1.3 μm into said optical fiber transmission line.

* * * * *